United States Patent
Okuyama

(10) Patent No.: US 9,247,217 B2
(45) Date of Patent: Jan. 26, 2016

(54) VEHICLE PERIPHERY MONITORING DEVICE AND VEHICLE PERIPHERY IMAGE DISPLAY METHOD

(75) Inventor: Yoshitaka Okuyama, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 482 days.

(21) Appl. No.: 13/259,134

(22) PCT Filed: Jul. 27, 2010

(86) PCT No.: PCT/JP2010/062571
§ 371 (c)(1),
(2), (4) Date: Sep. 22, 2011

(87) PCT Pub. No.: WO2011/013642
PCT Pub. Date: Feb. 3, 2011

(65) Prior Publication Data
US 2012/0026333 A1 Feb. 2, 2012

(30) Foreign Application Priority Data

Jul. 29, 2009 (JP) ................................. 2009-176308

(51) Int. Cl.
*H04N 7/18* (2006.01)
*G06K 9/46* (2006.01)
*G06K 9/66* (2006.01)
(Continued)

(52) U.S. Cl.
CPC ...... *H04N 7/181* (2013.01); *B60R 1/00* (2013.01); *G06T 5/009* (2013.01); *G06T 5/50* (2013.01); *B60R 2300/103* (2013.01); *B60R 2300/105* (2013.01); *B60R 2300/106* (2013.01);
(Continued)

(58) Field of Classification Search
CPC ........ B60Q 1/2665; B60Q 1/525; G08G 1/16; G08G 1/167
See application file for complete search history.

(56) References Cited

U.S. PATENT DOCUMENTS 7,317,813 B2 * 1/2008 Yanagawa et al. ............. 382/104
2002/0196340 A1 * 12/2002 Kato et al. ..................... 348/148
(Continued)

FOREIGN PATENT DOCUMENTS

CN 101048296 10/2007
EP 1383331 A1 1/2004
(Continued)

OTHER PUBLICATIONS

International Search Report dated Oct. 27, 2010 for Application No. PCT/JP2010/062571.
(Continued)

*Primary Examiner* — Joseph Ustaris
*Assistant Examiner* — Rebecca Volentine
(74) *Attorney, Agent, or Firm* — Knobbe Martens Olson & Bear LLP

(57) ABSTRACT

From a plurality of imaging units (110) which capture images of a vehicle periphery and from an image taken by any one of the plurality of imaging units (any one of 111, 121, 131, 141), a value corresponding to brightness of the image is calculated. Based on the calculated value, brightness of images obtained by the plurality of imaging units (110) is corrected by a brightness correction unit (120). After a predetermined coordinate transformation is performed on the brightness corrected images, the images are combined into a single image, and the single image is displayed together with the image taken by the one imaging unit (any one of 111, 121, 131, 141).

6 Claims, 14 Drawing Sheets

(51) Int. Cl.
 *B60R 1/00* (2006.01)
 *G06T 5/50* (2006.01)
 *G06T 5/00* (2006.01)

(52) U.S. Cl.
 CPC ... *B60R2300/305* (2013.01); *B60R 2300/8053* (2013.01); *G06T 2207/30252* (2013.01)

(56) References Cited

U.S. PATENT DOCUMENTS

| | | | |
|---|---|---|---|
| 2006/0203092 A1* | 9/2006 | Nobori et al. | 348/148 |
| 2006/0274147 A1* | 12/2006 | Chinomi et al. | 348/118 |
| 2007/0085901 A1* | 4/2007 | Yang et al. | 348/47 |
| 2007/0253622 A1* | 11/2007 | Ikeda | H04N 7/18 382/190 |
| 2007/0285549 A1* | 12/2007 | Takano | 348/333.01 |
| 2008/0002025 A1 | 1/2008 | Kakinami | |
| 2008/0043113 A1* | 2/2008 | Ishii | 348/218.1 |
| 2009/0284598 A1* | 11/2009 | Busch et al. | 348/148 |
| 2010/0295937 A1* | 11/2010 | Longobardi | 348/118 |

FOREIGN PATENT DOCUMENTS

| | | |
|---|---|---|
| JP | 2002324235 A | 11/2002 |
| JP | 2007141098 A | 6/2007 |
| JP | 2007325074 A | 12/2007 |
| JP | 2009141456 A | 6/2009 |
| JP | 2009152966 A | 7/2009 |
| WO | 02089484 A1 | 11/2002 |

OTHER PUBLICATIONS

Office Action issued Jan. 14, 2013 in corresponding Chinese Application No. 201080004072.3.

* cited by examiner

VEHICLE PERIPHERY MONITORING DEVICE AND VEHICLE PERIPHERY IMAGE DISPLAY METHOD

CROSS-REFERENCE TO RELATED APPLICATIONS

This application is the U.S. National Phase under 35. U.S.C. §371 of International Application PCT/JP2010/062571, filed Jul. 27, 2010, which claims priority to Japanese Patent Application No. 2009-176308, filed Jul. 29, 2009. The International Application was published under PCT Article 21(2) in a language other than English.

TECHNICAL FIELD

The present invention relates to a vehicle periphery monitoring device and a vehicle periphery image display method, and specifically relates to a method of obtaining a natural composite image by correcting differences in brightness among multiple images taken in directions different from each other.

BACKGROUND ART

In recent years, systems have grown popular which include a camera mounted on a vehicle and provide a driver with an image of a vehicle periphery which can easily be a blind spot.

In particular, recently, systems such as the followings have been put to practical use: a system which provides an overhead image viewed from right above a vehicle and obtained through coordinate transformation of an image taken by a camera, and a system which has multiple cameras mounted on a vehicle, and provides a 360° image of a vehicle periphery by combining overhead images obtained by the coordinate transformation.

Such systems which combine images taken by multiple cameras into a single image have a problem that a composite image brings a feeling of strangeness because brightness is discontinuous at seams of images due to a type difference among cameras which constitute the system. Even with cameras of the same type, this problem also happens because the cameras differently work in automatic exposure correction, or a light amount decreases in proportion to a distance from the center of each camera.

To solve such a problem, techniques have been conventionally proposed which correct brightness of images taken by respective cameras so that image areas taken in common by adjacent cameras can have the same average brightness, and display the brightness-corrected image. (Patent Document 1, Patent Document 2)

PRIOR ART DOCUMENT

Patent Document

Patent Document 1: Patent Publication No. 3297040
Patent Document 2: Japanese Patent Application Publication No. 2007-141098

SUMMARY OF THE INVENTION

Problems to be Solved by the Invention

In these conventional proposals, brightness is corrected as a prerequisite to provision of an image obtained through coordinate transformation and combination of multiple images.

For this reason, if a vehicle periphery monitoring device is implemented which has a function of enabling checking conditions around a vehicle while checking an image behind the vehicle, by simultaneously displaying the image behind the vehicle and an overhead image of a vehicle periphery side-by-side, for example, or a function of enabling checking conditions around a vehicle while checking an image in front of the vehicle by displaying the image in front of the vehicle and an overhead image of a vehicle periphery side-by-side, the vehicle periphery monitoring device corrects brightness of a composite image and also inevitably corrects brightness of the other image, that is, the image behind or in front of the vehicle at the same time.

For example, if brightness frequently changes in some of images taken by multiple cameras, there arises a problem that an image behind or in front of the vehicle, which is displayed together with a composite image of a vehicle periphery, is also corrected in brightness by using a brightness correction value calculated to correct brightness of a single composite image obtained by combining the multiple images, and therefore becomes difficult to see.

The present invention has been made in light of the above circumstances, and an object of the present invention is to provide a vehicle periphery monitoring device and a vehicle periphery image display method which are capable of correcting brightness of a composite image without causing mutual influence of two or more types of images displayed side-by-side and including the composite image.

Means for Solving the Problem

The present invention can provide easy-to-see images even in an environment in which brightness strongly changes, by correcting brightness of a composite overhead image of the vehicle periphery on the basis a value corresponding to brightness of an image behind a vehicle, when the composite overhead image of a vehicle periphery and the image behind the vehicle are displayed side-by-side.

In other words, a vehicle periphery monitoring device according to the present invention includes multiple imaging units which are mounted on a vehicle and capture images of a vehicle periphery, an image brightness calculation unit which calculates a value corresponding to brightness of an image taken by any one of the multiple imaging units from the image taken by the one of the imaging units, a brightness correction unit which corrects brightness of the images obtained by the multiple imaging units on the basis of the value calculated by the image brightness calculation unit, an image transformation unit which performs a predetermined coordinate transformation process on the image with the brightness thereof corrected by the brightness correction unit, an image combining unit which combines multiple images after the coordinate transformation process into a single image, and an image display unit which simultaneously displays the composite image obtained by the image combining unit and the image taken by the one of the imaging units.

With such configured vehicle periphery monitoring device according to the present invention, the image brightness calculation unit calculates a value corresponding to brightness of an image taken by one of the multiple imaging units, and the brightness correction unit corrects brightness of the images taken by the multiple imaging units on the basis of the calculated value.

The brightness corrected images are coordinate transformed by the image transformation unit and further combined into a single image by the image combining unit. Since the single composite image and an image taken by one of the multiple imaging units are displayed side-by-side, only brightness of the composite image can be corrected without affecting brightness of the image taken by the one of the multiple imaging units.

In addition, it is desirable that the vehicle periphery monitoring device according to the present invention includes a traveling direction judgment unit which judges a traveling direction of a vehicle and an imaging-unit-selecting unit which selects one imaging unit from the multiple imaging units on the basis of the judgment result of the traveling direction judgment unit, in which the image brightness calculation unit calculates a value corresponding to brightness of an image taken by the one imaging unit selected by the imaging-unit-selecting unit, and the image display unit simultaneously displays the composite image obtained by the image combining unit and the image taken by the one imaging unit selected by the imaging-unit-selecting unit.

With such configured vehicle periphery monitoring device according to the present invention, one imaging unit is selected by the imaging-unit-selecting unit on the basis of the result judged by the traveling direction judgment unit, and a value corresponding to brightness of an image taken by the selected imaging unit. The brightness correction unit corrects brightness of images taken by multiple imaging units on the basis of the calculated value. The brightness corrected images are coordinate transformed by the image transformation unit and further combined into a single image by the image combining unit. Since the single composite image and the image taken by the one of the multiple imaging units are displayed side-by-side, information of a traveling direction can be presented to a driver with the result of brightness correction not affecting brightness of an image in the travelling direction of a vehicle, to which most attention should be paid during driving, thus being effective in conforming safety around the vehicle.

In addition, it is preferable that the vehicle periphery monitoring device according to the present invention is such that the imaging-unit-selecting unit selects a first imaging unit from multiple imaging units which capture images in three or more directions and which are mounted so that the ranges captured by at least two imaging units of the multiple imaging units partly overlap each other; the image brightness calculation unit calculates a value corresponding to brightness of a first overlapping imaging range included in an image taken by the selected first imaging unit and in an image taken by a second imaging unit which shares the first overlapping imaging range with the selected first imaging unit, or calculates a value corresponding to brightness of a neighborhood of the first overlapping imaging range; the brightness correction unit corrects brightness of the image taken by the second imaging unit on the basis of the calculated value; the image brightness calculation unit further calculates, based on the brightness corrected result, a new value corresponding to brightness of a second overlapping imaging range or corresponding to brightness of a neighborhood of the second overlapping imaging range, from the brightness corrected image and an image taken by a third imaging unit and sharing the second overlapping imaging range with the brightness corrected image; the brightness correction unit further corrects brightness of the image taken by the third imaging unit on the basis of the calculated new value; and the image brightness calculation unit and the brightness correction unit sequentially repeat the calculation of brightness and the correction of brightness in the same manner thereafter.

With such configured vehicle periphery monitoring device according to the present invention, since brightness of an overlapping imaging range of two images with mutually overlapping imaging areas or brightness of a neighborhood of the overlapping imaging range is corrected as well as the imaging-unit-selecting unit selects an imaging unit depending on a vehicle status, brightness of a different image captured for an area partly overlapping with the reference image can be recursively corrected based on brightness of a reference image. Thus, in the vehicle periphery monitoring device which combines a number of images into a single image and displays the image, a feeling of unevenness in brightness at the seams of images can be substantially reduced, thereby enabling provision of easy-to-see images to drivers.

Furthermore, since image brightness correction can be performed by adjustment of brightness when images taken by imaging units are decoded, the brightness correction can be performed in a short period of time.

In addition, it is preferable that a vehicle periphery monitoring device according to the present invention is such that the image brightness calculation unit calculates a value corresponding to brightness of a first overlapping imaging range included in an image taken by a first imaging unit of multiple imaging units which capture the images in three or more directions and which are mounted so that the ranges captured by at least two imaging units of the multiple imaging units partly overlap each other and included in an image taken by a second imaging unit sharing the first overlapping imaging unit with the first imaging unit, or calculates a value corresponding to brightness of a neighborhood of the first overlapping imaging range; the brightness correction unit corrects brightness of the image taken by the second imaging unit on the basis of the calculated value; the image brightness calculation unit further calculates, based on the brightness corrected result, a new value corresponding to brightness of a second overlapping imaging range or corresponding to brightness of a neighborhood of the second overlapping imaging unit, from the brightness corrected image and an image taken by a third imaging unit sharing the second overlapping imaging range with the brightness corrected image; the brightness correction unit further corrects brightness of the image taken by the third imaging unit on the basis of the calculated new value; and the image brightness calculation unit and the brightness correction unit sequentially repeat the calculation of brightness and the correction of the brightness in the same manner thereafter.

With such configured vehicle periphery monitoring device according to the present invention, in particular, in the vehicle periphery monitoring devices which combine a number of images into a single image and display the image, since image brightness can be sequentially corrected on the basis of pre-selected image brightness, a feeling of unevenness in brightness at the seams of images can be substantially reduced and easy-to-see images can be provided to drivers.

Furthermore, since image brightness correction can be performed by adjustment of brightness when images taken by imaging units are decoded, the brightness correction can be performed in a short period of time.

In addition, a vehicle periphery image display method calculates a value corresponding to brightness of one image from multiple images captured for a vehicle periphery, corrects brightness of the multiple images on the basis of the calculated value, performs a predetermined coordinate transformation process on the brightness corrected images, combines the multiple coordinate-transformed images into a single image, and displays the composite image and the one image simultaneously.

With such configured vehicle periphery image display method according to the present invention, brightness of only the composite image can be corrected with no influence on brightness of the one image, because of the operation described above.

In addition, it is preferable that the vehicle periphery image display method judges a traveling direction of a vehicle, selects one image from multiple images captured for a vehicle periphery on the basis of the judgment result of the traveling direction, calculates a value corresponding to brightness of the one selected image from the one image, corrects brightness of the multiple images on the basis of the calculated value, performs a predetermined coordinate transformation process on the brightness corrected images, combines the multiple coordinate-transformed images into a single image, and displays the composite image and the one selected image simultaneously.

With such configured vehicle periphery image display method according to the present invention, the operation described above can provide drivers information useful for safety confirmation around a vehicle, since the result of image brightness correction does not affect brightness of an image in a traveling direction of the vehicle to which most attention should be paid during driving.

In addition, it is preferable that a vehicle periphery image display method according to the present invention selects a first image from multiple images captured for three or more directions and set so that imaging ranges of at least two of the multiple images partly overlap each other, calculates a value corresponding to brightness of a first overlapping imaging range included in the selected first image and in a second image sharing the first overlapping imaging area with the selected first image, or a value corresponding to brightness of a neighborhood of the first overlapping imaging range, corrects brightness of the second image on the basis of the calculated value, calculates, based on the brightness corrected result, a new value corresponding to brightness of a second overlapping imaging range or corresponding to brightness of a neighborhood of the second overlapping imaging area from the brightness corrected image and a third image sharing the second overlapping imaging range with the brightness corrected image, corrects brightness of the third image on the basis of the calculated new value, and sequentially repeats the calculation of brightness and the correction of brightness in the same manner thereafter.

With such configured vehicle periphery image display method according to the present invention, the operation described above can substantially reduce a feeling of unevenness in brightness at the seams of images when multiple images are combined into a single image and provide drivers with easy-to-see images.

Furthermore, image brightness is corrected by adjustment of brightness when captured images are decoded, the brightness correction can be performed in a short period of time.

In addition, it is preferable that a vehicle periphery image display method according to the present invention calculates a value corresponding to brightness of a first overlapping imaging range included in a first image of multiple images captured for three or more directions and set so that imaging ranges of at least two images of the multiple images partly overlap and included in a second image in which the first overlapping imaging area that overlaps the first image is captured, or a value corresponding to brightness of a neighborhood of the first overlapping imaging range, corrects brightness of the second image on the basis of the calculated value, calculates, based on the brightness corrected result, a new value corresponding to brightness of a second overlapping imaging area or corresponding to brightness of a neighborhood of the second overlapping imaging range from the brightness corrected image and a third image sharing the second overlapping imaging range with the brightness corrected image, corrects brightness of the third image on the basis of the calculated new value, and sequentially repeats the calculation of brightness and the correction of brightness in the same manner thereafter.

With such configured vehicle periphery image display method according to the present invention, since brightness of images can sequentially be corrected with brightness of a preselected image as a reference, a feeling of unevenness at the seams of images can be substantially reduced and easy-to-see images can be provided to drivers.

Furthermore, since image brightness correction can be performed by adjustment of brightness when images taken by imaging units are decoded, the brightness correction can be performed in a short period of time.

Effects of the Invention

With a vehicle periphery monitoring device and a vehicle periphery image display method, when a composite overhead image of a vehicle periphery and an image behind a vehicle are displayed side-by-side, there is the effect of being able to provide easy-to-see images even in an environment in which brightness sharply changes, by correcting brightness of the composite overhead image of the vehicle periphery on the basis of a value corresponding to brightness of the image behind the vehicle.

BRIEF DESCRIPTION OF THE DRAWINGS

FIG. 6C is a view showing an example in which predetermined areas for brightness correction are set in an image taken by a right side camera.

MODE FOR CARRYING OUT THE INVENTION

Embodiments of a vehicle periphery monitoring device of the present invention will be described hereinafter with reference to the drawings.

Embodiment 1

Figure 1:
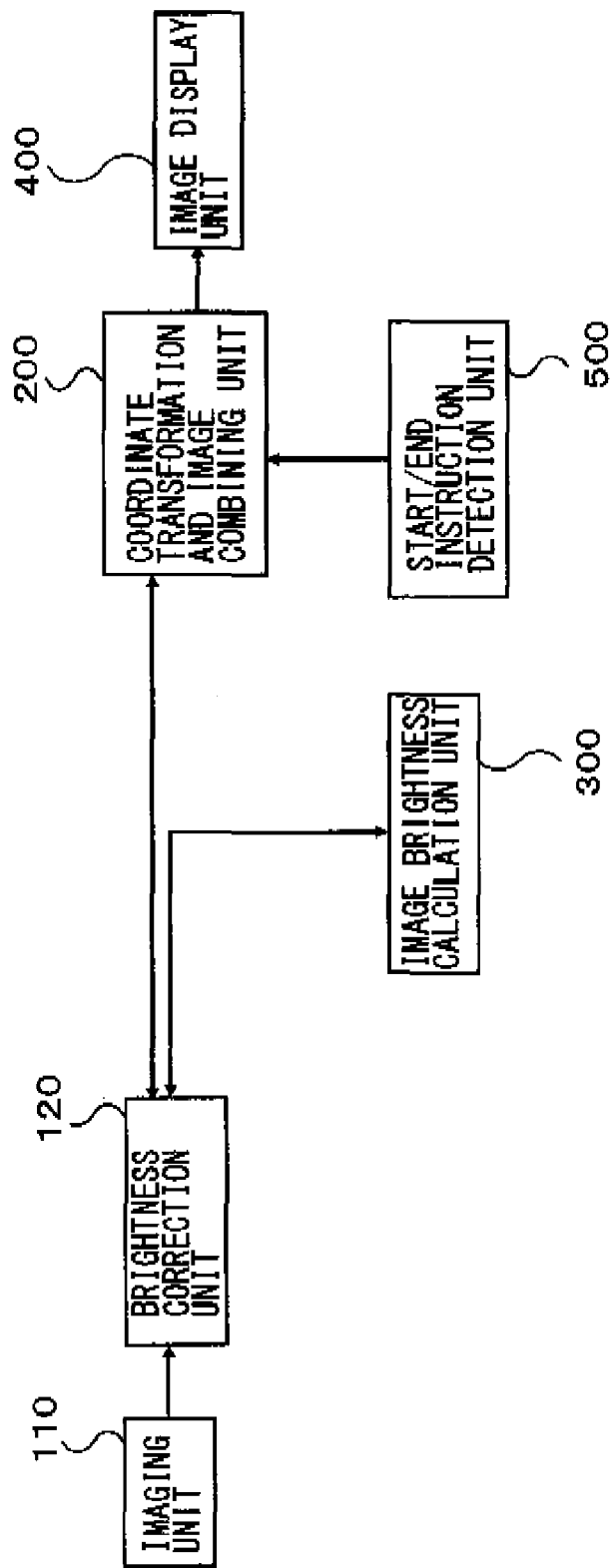
FIG. 1 is a block diagram showing a schematic configuration of a vehicle periphery monitoring device according to a first embodiment of the present invention.

FIG. 1 is a block diagram showing a schematic configuration of a first embodiment of a vehicle periphery monitoring device according to the present invention.

Figure 2:
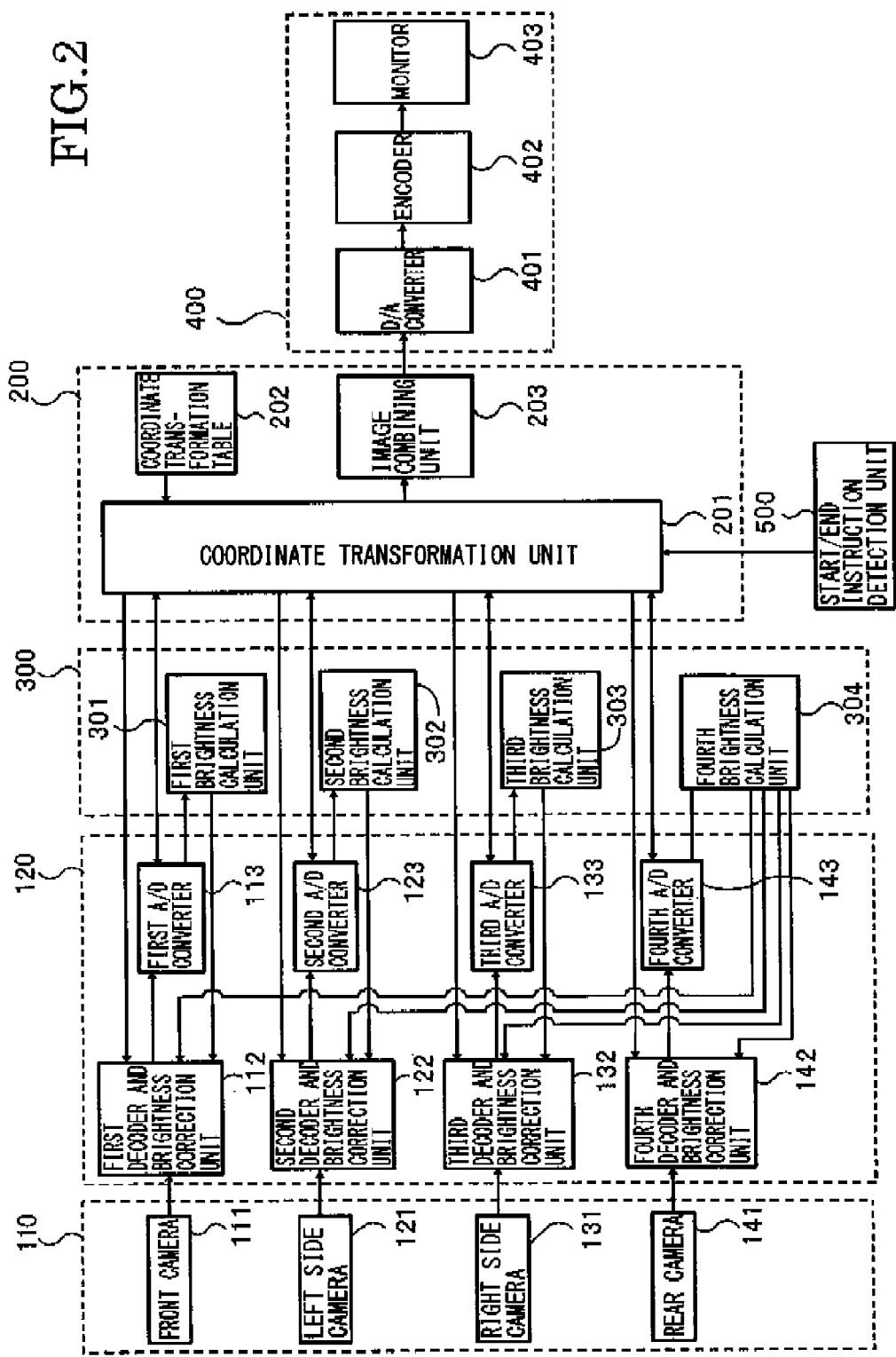
FIG. 2 is a block diagram showing a detailed configuration of an imaging an imaging unit, a brightness correction unit, a coordinate transformation and image combining unit, an image brightness calculation unit, and an image display unit in the vehicle periphery monitoring device of FIG. 1.

FIG. 2 is a block diagram showing a detailed configuration of an imaging unit 110, a brightness correction unit 120, a coordinate transformation and image combining unit 200, an image brightness calculation unit 300, and an image display unit 400 in the vehicle periphery monitoring device of FIG. 1.

Figure 3:
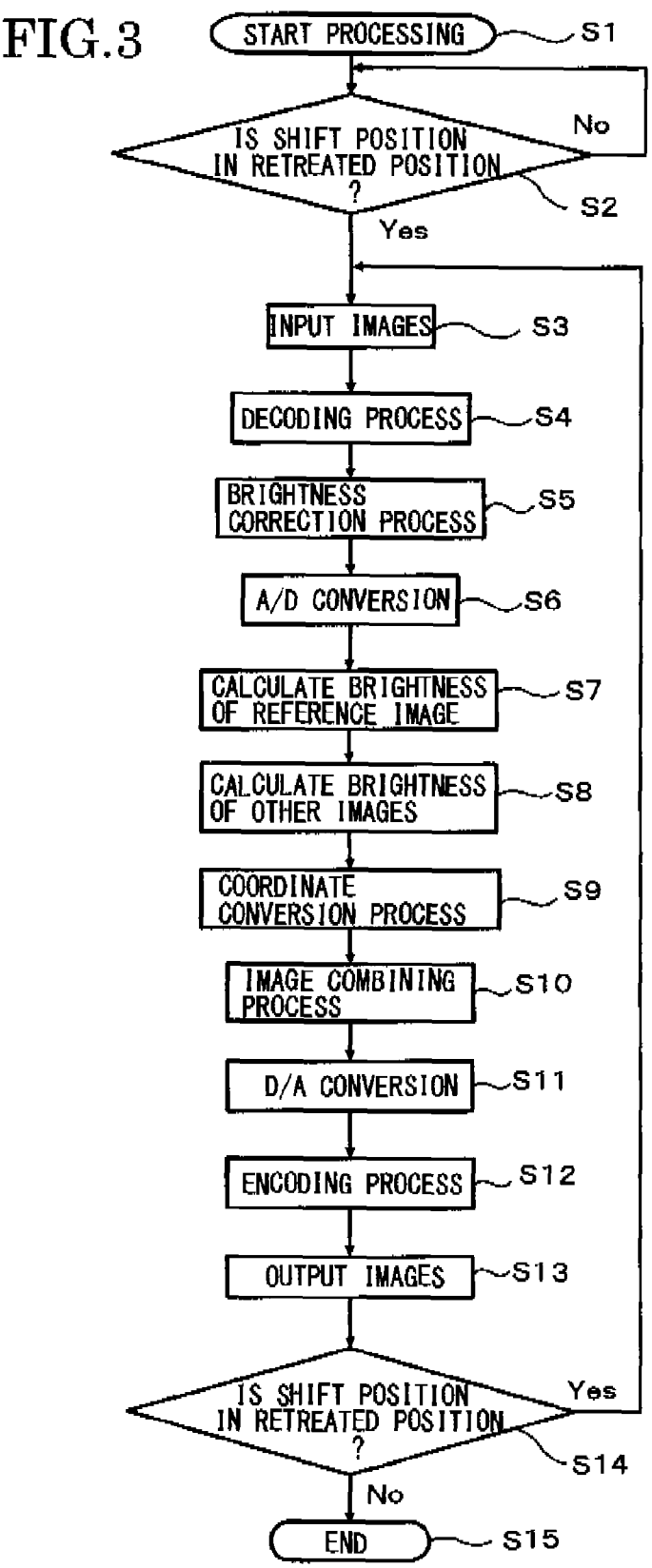
FIG. 3 is a flow chart showing a series of processing steps in the vehicle periphery monitoring device shown in FIG. 2.

FIG. 3 is a flow chart showing a series of processing steps in the vehicle periphery monitoring device shown in FIG. 2.

As shown in the block diagram of FIG. 1, the vehicle periphery monitoring device according to the embodiment includes the imaging unit 110 such as N CCD cameras or C-MOS cameras which observe different directions respectively, the brightness correction unit 120 which corrects brightness of images inputted by the imaging units, the coordinate transformation and image combining unit 200 which performs coordinate transformation on the images outputted from the brightness correction unit 120 and further combines them into a single image, the image brightness calculation unit 300 which calculates brightness of captured images, the image display unit 400 including a monitor, etc., which shows the result of coordinate transformation and image combination performed, and a start/end instruction detection unit 500 which detects an instruction to start or end the vehicle periphery monitoring device. In addition, this vehicle periphery monitoring device is mounted on a vehicle not shown in FIG. 1.

The embodiment is described taking, as an example, a case where the imaging unit 110 includes four cameras. That is to say, the imaging unit 110 and the brightness correction unit 120 include a front camera 111 for observing the forward direction of a vehicle and a first decoder and brightness correction unit 112 and a first A/D converter 113 connected thereto, a left side camera 121 for observing the left direction of the vehicle and a second decoder and brightness correction unit 122 and a second A/D converter 123 connected thereto, a right side camera 131 for observing the right direction of the vehicle and a third decoder and brightness correction unit 132 and a third A/D converter 133 connected thereto, and a rear camera 141 for observing the backward direction of the vehicle and a fourth decoder and brightness correction unit 142 and a fourth A/D converter 143 connected thereto.

In addition, the coordinate transformation and image combining unit 200 includes a coordinate transformation unit 201, a coordinate transformation table 202, and an image combining unit 203.

The image brightness calculation unit 300 includes a first brightness calculation unit 301 connected to the first A/D converter 113, a second brightness calculation unit 302 connected to the second A/D converter 123, a third brightness calculation unit 303 connected to the third A/D converter 133, and a fourth brightness calculation unit 304 connected to the fourth A/D converter 143.

Furthermore, the image display unit 400 includes a D/A converter 401, an encoder 402, and a monitor 403.

Figure 4:
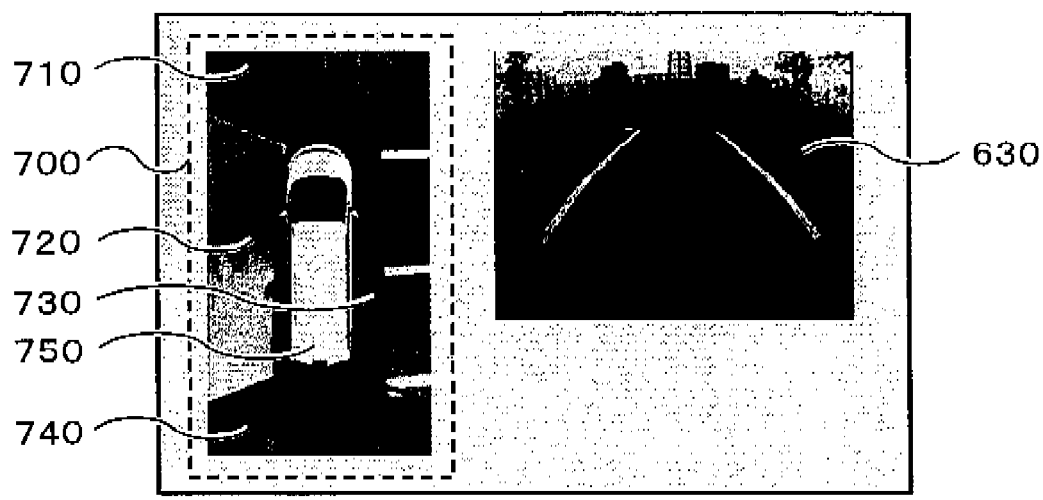
FIG. 4 shows a view showing one example of images created in the first embodiment of the present invention and presented to a driver.

As shown in FIG. 4, the vehicle periphery monitoring device in the embodiment is configured to display, as a single image, one composite image 700 in which 360° information pieces on a vehicle periphery are combined and an image 630 captured for a backward direction of the vehicle, on the monitor 403.

Figure 6A:
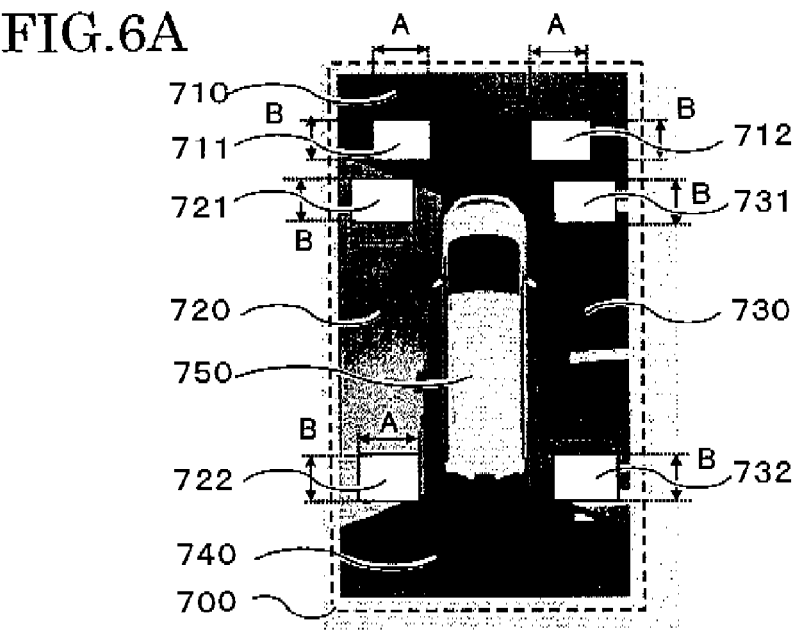
FIG. 6 is a view illustrating a method for calculating brightness of images to be calculated by a first brightness calculation unit, a second brightness calculation unit, and a third brightness calculation unit shown in FIG. 2.
FIG. 6B is a view showing an example in which predetermined areas for brightness correction are set in an image taken by a front camera.
FIG. 6C is a view showing an example in which predetermined areas for brightness correction are set in an image taken by a left side camera.
Figure 6B:
Figure 6C:
Figure 6D:
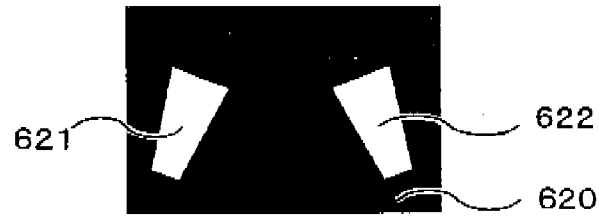

Now, the composite image 700 is a single image obtained by combining an image 710 looking down at an image 600 taken by the front camera 111 shown in FIG. 6B from an overhead virtual viewing point V, an image 720 looking down at an image 610 taken by the left side camera 121 shown in FIG. 6C from the overhead virtual viewing point V, an image 730 looking down at an image 620 taken by the right side camera 181 shown in FIG. 6D from the overhead virtual viewing point V, an image 740 looking down at an image 630 taken by the rear camera 141 as shown in FIG. 4 from the overhead virtual viewing point V, and an image 750 looking down at the vehicle having this device attached from the overhead virtual viewing point V.

In addition, although the embodiment is configured to observe the four directions of a vehicle, the number of directions to observe is not limited to this, and the embodiment may be configured to observe more number of directions.

Even in such a case, the present invention can still be implemented with the operation similar to the embodiment.

The operation of the vehicle periphery monitoring device according to the embodiment will be described hereinafter with reference to the flow chart of FIG. 3.

The front camera 111, the left side camera 121, the right side camera 131, and the rear camera 141 are attached to the vehicle in a layout in which imaging ranges of adjacent cameras (the front camera 111 and the left side camera 121, the front camera 111 and the right side camera 131, the left side camera 121 and the rear camera 141, and the right side camera 131 and the rear camera 141) partly overlap.

The start/end instruction detection unit 500 detects that a shift position is in a retreated position (S2 of FIG. 3), the coordinate transformation unit 201 generates a trigger signal. The trigger signal is inputted to the first decoder and brightness correction unit 112, the first A/D converter 113, the second decoder and brightness correction unit 122, the second A/D converter 123, the third decoder and brightness correction unit 132, the third A/D converter 133, the fourth decoder and brightness correction unit 142, and the fourth A/D converter 143.

When each camera receives the trigger signal, the front camera 111, the left side camera 121, the right side camera 131, and the rear camera 141 simultaneously input an image (S3 of FIG. 3).

The image inputted from the front camera 111 is converted from composite signals into component signals by the first decoder and brightness correction unit 112 (S4 of FIG. 3). Furthermore, a luminance signal of the converted component signals is converted into a digital signal by the first A/D converter 113 and the image 600 is generated (S6 of FIG. 3). Similarly, the image inputted from the left side camera 121 is converted from the composite signals into the component signals by the second decoder and the brightness correction unit 122 (S4 of FIG. 3). Furthermore, the luminance signal of the converted component signals is converted into a digital signal by the second A/D converter 123 and the image 610 is generated (S6 of FIG. 3). The image inputted from the right side camera 131 is converted from the composite signals into the component signals by the third decoder and the brightness correction unit 132 (S4 of FIG. 3). Furthermore, the luminance signal of the converted composite signals is converted into a digital signal by the third A/D converter 133, and the image 620 is generated (S6 of FIG. 3). The image inputted from the rear camera 141 is converted from the composite signals into the component signals by the fourth decoder and brightness correction unit 142 (S4 of FIG. 3). Furthermore, the luminance signal of the converted component signal is converted into a digital signal by the fourth A/D converter 143, and the image 630 is generated (S6 of FIG. 3).

In addition, now, brightness of the captured image is corrected (S5 of FIG. 3) at the same time when the signal is converted from the composite signal into the component signal. However, since a correction amount for correcting brightness of the image has not been calculated, the brightness correction is not performed when an initial image after starting of the vehicle periphery monitoring device is inputted.

Figure 5:
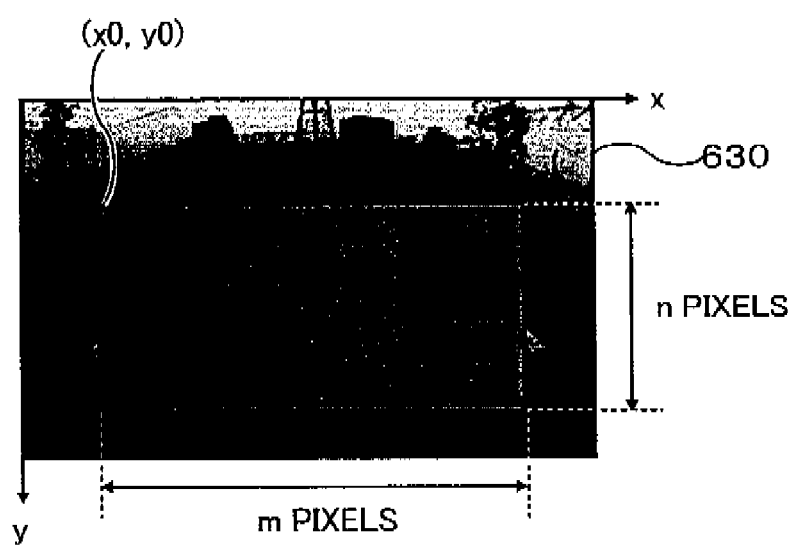
FIG. 5 is a view illustrating a method for calculating brightness of an image to be calculated by a fourth brightness calculation unit of FIG. 2.

Then, the fourth brightness calculation unit 304 calculates an average value of a pixel value of predetermined areas in the image 630 taken by the rear camera 141 (S7 of FIG. 3). Here, as shown in FIG. 5, an area consisting of m pixels in a horizontal direction and n pixels in a vertical direction is set to a prescribed position (x0, y0) which has been determined in advance, and an average value I ave of all pixel values in that area is calculated.

Then, the first brightness calculation unit 301 calculates an average value of pixel values in a predetermined area in the image 600 taken by the front camera 111 (S8 of FIG. 3). Here, as shown in FIG. 6B, an area 601 and an area 602 of a predetermined size are set at prescribed positions which have been determined in advance, and an average value I 1 ave of all the pixel values in the area 610 and the area 620 is calculated.

Now, as shown in FIG. 6A, the area 601 is an area to be converted into a rectangular area 711 having a size of width A and length B at a position where the imaging ranges of the front camera 111 and the left side camera 121 overlap or in the vicinity thereof, when the image 600 is converted into the image 710 looking down from the overhead virtual viewing point V. Furthermore, the area 602 is an area to be converted into a rectangular area 712 having a size of width A and length B at a position where the imaging ranges of the front camera 111 and the right side camera 131 overlap or in the vicinity thereof when the image 600 is converted into the image 710 looking down from the overhead virtual viewing point V.

In addition, the positions of the area 601 and the area 602 can be determined in advance by calculations. The calculated positions of the areas are stored in advance in the first brightness calculation unit 301.

Next, the second brightness calculation unit 302 calculates an average value of pixel values in predetermined areas in the image 610 taken by the left side camera 121 (S8 of FIG. 3). Here, as shown in FIG. 6C, an area 611 and an area 612 of a predetermined size are set at prescribed positions in the image 610 which have been determined in advance, and an average value I 2ave of all the pixel values in the area 611 and the area 612 is calculated.

Now, as shown in FIG. 6A, the area 611 is an area to be converted into a rectangular area 721 having a size of width A and length B at a position where the imaging ranges of the front camera 111 and the left side camera 121 overlap or in the vicinity thereof, when the image 610 is converted into the image 720 looking down from the overhead virtual viewing point V. Furthermore, as shown in FIG. 6A, the area 612 is an area to be converted into a rectangular area 722 having a size of width A and length B at a position where the imaging ranges of the left side camera 121 and the rear camera 141 overlap or in the vicinity thereof, when the image 610 is converted into the image 720 looking down from the overhead virtual viewing point V.

In addition, the positions of the area 611 and the area 612 can be determined in advance by calculations. The calculated positions of the areas are stored in advance in the second brightness calculation unit 302.

Further, the third brightness calculation unit 303 calculates an average value of pixel values in predetermined areas in the image 620 taken by the right side camera 131 (S8 of FIG. 3). Here, as shown in FIG. 6D, an area 621 and an area 622 of a predetermined size are set at prescribed positions in the image 620 which have been determined in advance, and an average value I 3 ave of all the pixel values in the area 621 and the area 622 is calculated.

Now, as shown in FIG. 6A, the area 621 is an area to be converted into a rectangular area 731 having a size of width A and length B at a position where the imaging ranges of the front camera 111 and the right side camera 131 overlap or in the vicinity thereof, when the image 620 is converted into the image 730 looking down from the overhead virtual viewing point V. Furthermore, as shown in FIG. 6A, the area 622 is an area to be converted into a rectangular area 732 having a size of width A and length B at a position where the imaging ranges of the right side camera 131 and the rear camera 141 overlap or in the vicinity thereof, when the image 620 is converted into the image 730 looking down from the overhead virtual viewing point V.

In addition, the positions of the area 621 and the area 622 can be determined in advance by calculations. The calculated positions of the areas are stored in advance in the third brightness calculation unit 303.

Thus calculated average value I ave of the pixel values in the predetermined area of the image 630 and the average value I 1ave of the pixel values of the predetermined areas of the image 600 are transmitted to the first decoder and brightness correction unit 112 and stored therein. Similarly, the average value I ave of the pixel values in the predetermined area in the image 630 and the average value I 2ave of the pixel values of the predetermined areas of the image 610 are transmitted to the second decoder and the brightness correction unit 122 and stored therein, and the average value I ave of the pixel values in the predetermined area of the image 630 and the average value I 3ave of the pixel values in the predetermined area of the image 620 are transmitted to the third data and brightness correction unit 132 and stored therein.

The image 600, the image 610, the image 620, and the image 630 which have been generated in S6 of FIG. 3 are coordinate transformed by the coordinate transformation unit 201 and converted into an image looking down from the overhead virtual viewing point V (S9 of FIG. 3). The coordinate transformation process is calculated based on camera parameters such as geometric layout of each camera mounted on the vehicle or a focal length of the camera, pixel size, etc. and parameters such as a position of the virtual viewing point V or observation range, etc. However, in general, the coordinate transformation process is performed by creating the coordinate transformation table 202 in advance based on camera parameters such as geometric layout of each camera mounted on the vehicle or a focal length of the camera, pixel size, etc. and parameters such as a position of the virtual viewing point V or observation range, etc., and then replacing coordinates of the inputted images on the basis of this coordinate transformation table 202.

Through the coordinate transformation, the image 600 taken by the front camera 111 is converted into the image 710, the image 610 taken by the left side camera 121 is converted into the image 720, the image 620 taken by the right side camera 131 is converted into the image 730, and the image 630 taken by the rear camera 141 is converted into the image 740. The converted results are combined into a single image by the image combining unit 203, and further a virtual image 750 looking down at the own vehicle from the overhead virtual viewing point V is combined therewith and a composite image 700 is generated. Furthermore, the composite image 700 is combined with the image 630 taken by the rear camera 141 and a single image shown in FIG. 4 is created (S10 of FIG. 3).

The composite image is reconstructed to component signals by the D/A converter 401 (S11 of FIG. 3), further converted into composite signals by the encoder 402 (S12 of FIG. 3), and displayed to the monitor 403 (S13 of FIG. 3).

The start/end instruction detection unit 500 detects whether or not a shift position is in a retreated position (S14 of FIG. 3). If the shift position is in any position other than the retreated position, the display on the monitor 403 is cancelled (S15 of FIG. 3).

If it is confirmed that the shift position is in the retreated position, the image is inputted again in S3 of FIG. 3.

The image inputted from the front camera 111 is converted from composite signals into component signals by the first decoder and brightness correction unit 112 (S4 of FIG. 3), and then, brightness is corrected based on the average value I ave of the pixel values in the predetermined area in the image 630 and the average value I 1ave of the pixel values in the predetermined areas in the image 600 (S5 of FIG. 3).

Specifically, if a currently set brightness value in the first decoder and brightness correction unit 112 is B1, and a newly set brightness value by brightness correction is B1', correction of brightness is performed by changing a brightness value from B1 to B1' based on (Formula 1).

$$B1'=B1+(I\text{ave}-I\text{1ave})\times w \quad \text{(Formula 1)}$$

where w represents a weighted value of brightness correction ($0 \leq w \leq 1$). When brightness of an image sharply changes, this is a value which is provided to avoid a brightness corrected value sharply changing accordingly. In addition, w is set to a prescribed value which has been determined in advance.

The brightness correction similar to this is also performed on the image 610 inputted from the left side camera 121 and the image 620 inputted from the right side camera 131.

That is to say, if a currently set brightness value in the second decoder and brightness correction unit 122 is B2, a newly set brightness value by the brightness correction is B2', a currently set brightness value in the third decoder and brightness correction unit 132 is B3, and a newly set brightness value by the brightness correction is B3', brightness of the image 610 is corrected by changing the brightness value from B2 to B2' based on the following (Formula 2). In addition, brightness of the image 620 is corrected by changing the brightness value from B3 to B3' based on the following (Formula 3).

$$B2'=B2+(I\text{ave}-I\text{2ave})\times w \quad \text{(Formula 2)}$$

$$B3'=B3+(I\text{ave}-I\text{3ave})\times w \quad \text{(Formula 3)}$$

In addition, since an image taken by the rear camera 141 is a reference image for performing image brightness correction, the image itself is not brightness corrected. Thus, w=0 is stored in the fourth decoder and brightness correction unit 142. That is to say, if the currently set brightness value in the fourth decoder and brightness correction unit 142 is B4 and a newly set brightness value by the brightness correction is B4', B4' is expressed in (Formula 4).

$$B4'=B4 \quad \text{(Formula 4)}$$

The images with the brightness corrected by (Formula 1), (Formula 2), (Formula 3), and (Formula 4) are converted into digital signals by the first A/D converter 113, the second A/D converter 123, the third A/D converter 133, and the fourth A/D converter 143, and an image 600, an image 610, an image 620, and an image 630, which are new, with the brightness thereof corrected are generated (S6 of FIG. 3).

For the image 600, the image 610, the image 620, and image 630, which are new, with the brightness thereof corrected, the image brightness calculation unit 300 calculates I ave, I 1ave, I 2ave, and I 3ave again.

Of I ave, I 1ave, I 2ave, and I 3ave which have been thus calculated, I ave and I 1ave are transmitted to the first decoder and brightness correction unit 112 and stored therein. In addition, I ave and I 2ave are transmitted to the second decoder and brightness correction unit 122 and stored therein. Furthermore, I ave and I 3ave are transmitted to the third decoder and brightness correction unit 132 and stored therein. Since no brightness correction is performed on any image inputted from the rear camera, w=0 is stored in the fourth decoder and brightness correction unit 142.

Next, a coordinate transformation process and an image combining process are performed on the brightness corrected images. After being subjected to D/A conversion, the composite images are converted into composite signals by the encoding process and outputted to the monitor 403.

Subsequently, as far as the shift position is in the retreated position, the processes mentioned above are continuously performed. Every time they are performed, brightness of the images is corrected based on the calculated newest brightness value.

With such configured vehicle periphery monitoring device according to the embodiment, when a 360° image that can look down at a vehicle periphery and an image captured for the backward direction of the vehicle are displayed simultaneously, easy-to-see images can be provided to drivers even if light and dark frequently changes, because the result of brightness correction of the overhead image does not affect the image captured for the backward direction of the vehicle.

In addition, in the embodiment, by setting an area consisting of m pixels in a horizontal direction and n pixels in a vertical direction at a prescribed position (x0, y0), as shown in FIG. 5, a reference value of image brightness correction was set as an average value I ave of all pixel values in the area. However a method for taking a reference value is not limited to this. For example, by setting an area 631 and an area 632 shown in FIG. 12E in the image 630 taken by the rear camera 141, an average value of all pixel values in the area 631 and 632 may be a reference for brightness correction. Now, the area 631 is an area to be converted into a rectangular area 741 having a size of width A and length B at a position where imaging ranges of the rear camera 141 and the left side camera 121 overlap or in the vicinity thereof when the image 630 is converted into the image 740 looking down from the overhead virtual viewing point V. In addition, the area 632 is an area to be converted into a rectangular area 742 in the image 740 having a size of width A and length B at a position where imaging ranges of the rear camera 141 and the right side camera 131 overlap or in the vicinity thereof. With the method for taking a reference, the effect that continuity of brightness at the seams of images is improved better than the method of the embodiment can be achieved.

In addition, the operation of the vehicle periphery monitoring device of the embodiment described above corresponds to an embodiment of a vehicle periphery image display method according to the present invention.

Embodiment 2

Figure 7:
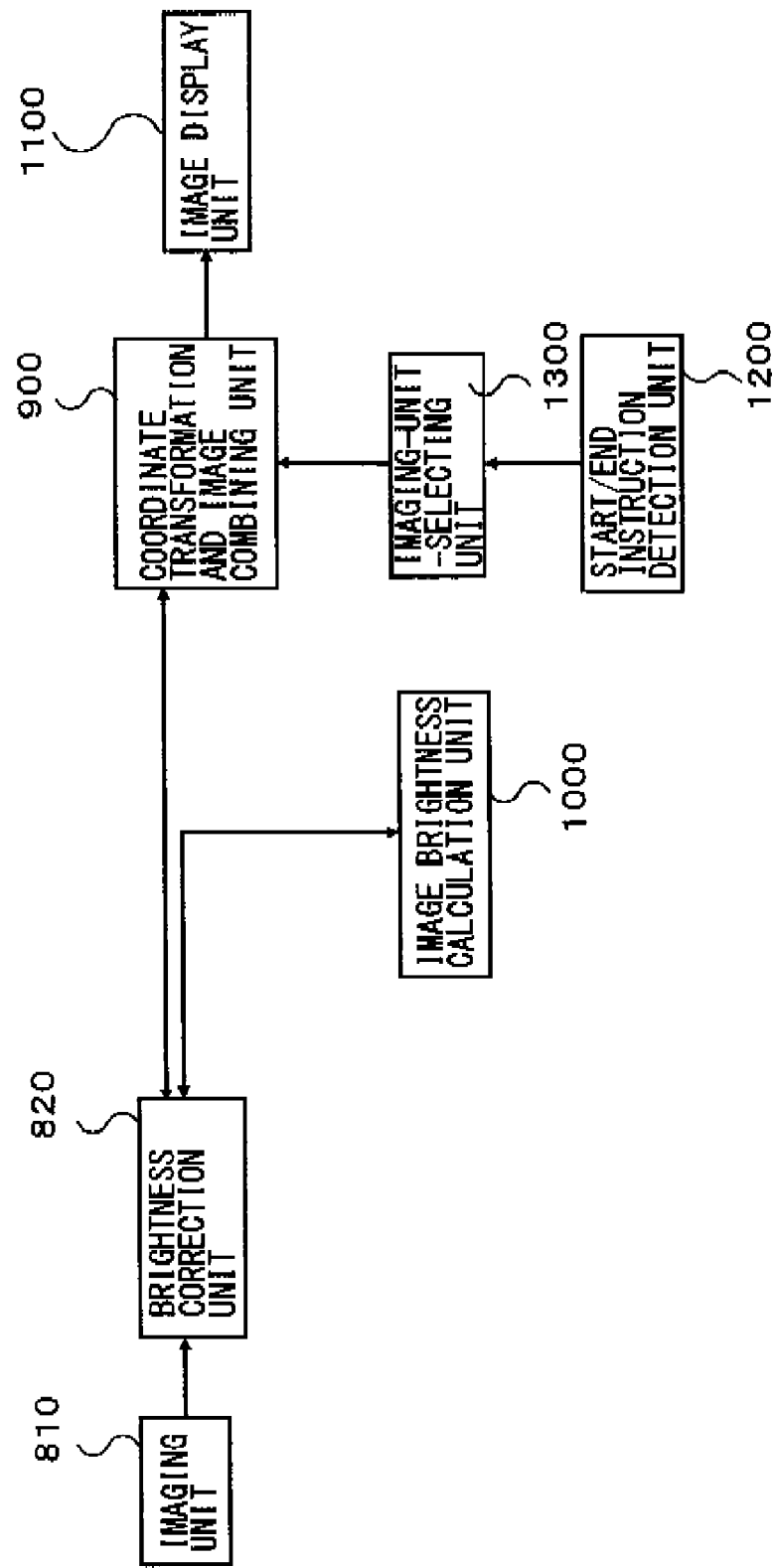
FIG. 7 is a block diagram showing a schematic configuration of a vehicle periphery monitoring device according to a second embodiment of the present invention.

FIG. 7 is a block diagram showing a schematic configuration of a second embodiment of a vehicle periphery monitoring device according to the present invention.

Figure 8:
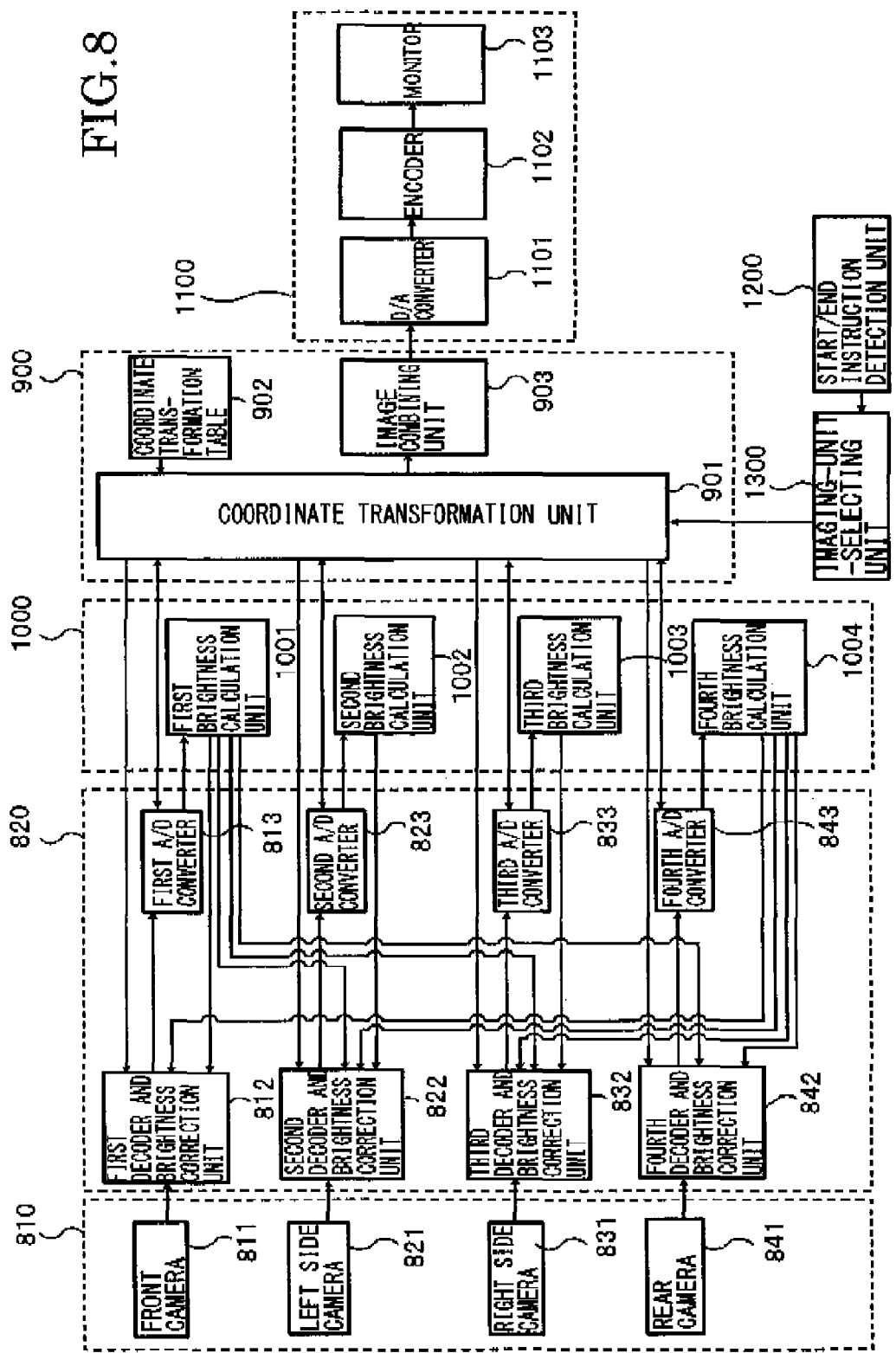
FIG. 8 is a block diagram showing a detailed configuration of an imaging unit, a brightness correction unit, a coordinate transformation and image combining unit, an image brightness calculation unit, and an image display unit in the vehicle periphery monitoring device in FIG. 7.

FIG. 8 is a block diagram showing a detailed configuration of an imaging unit 810, a brightness correction unit 820, a coordinate transformation and image combining unit 900, an image brightness calculation unit 1000, and an image display unit 1100 in the vehicle periphery monitoring device in FIG. 7.

Figure 9:
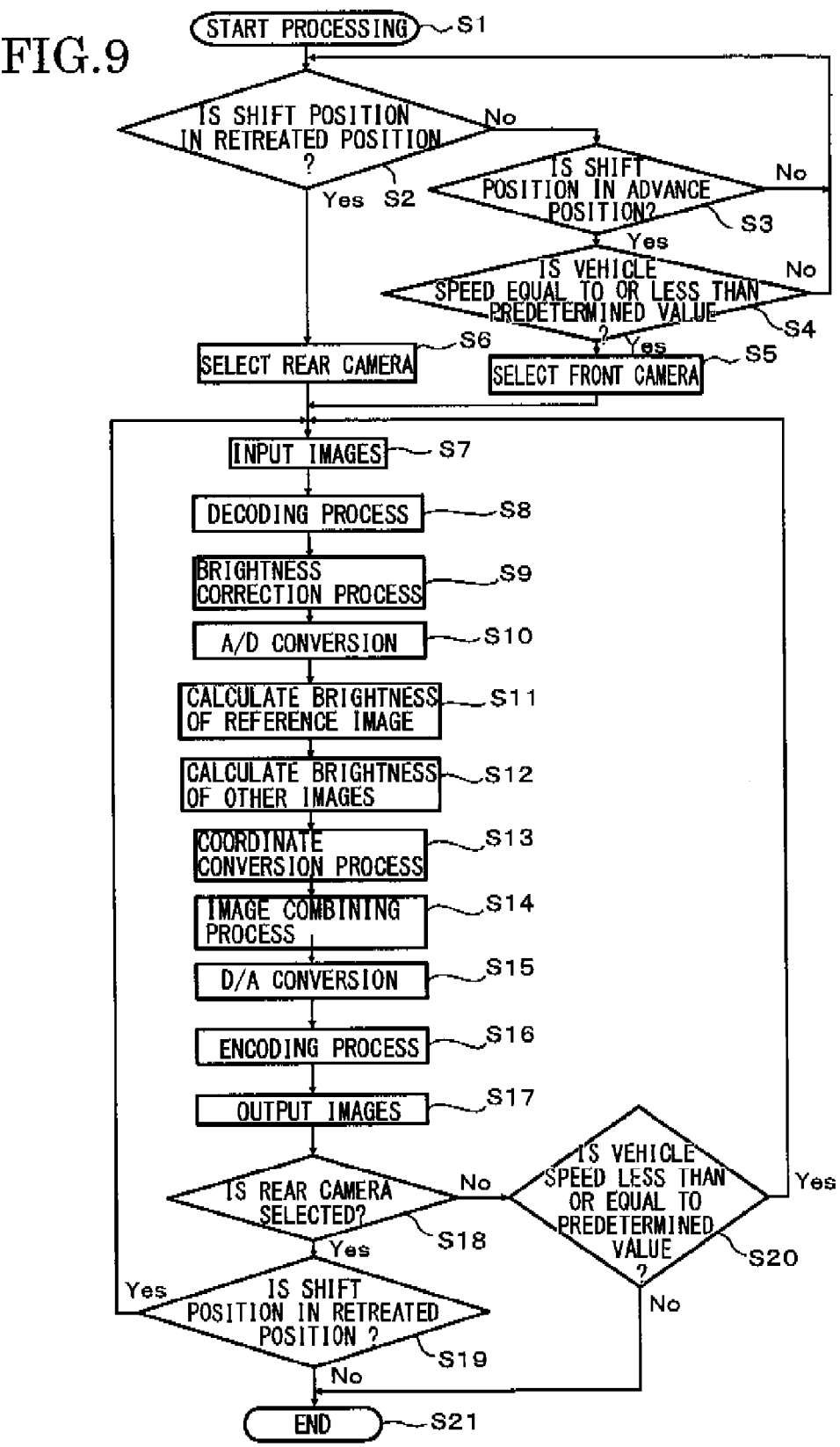
FIG. 9 is a flow chart showing a series of processing steps in the vehicle periphery monitoring device shown in FIGS. 7 and 8.

FIG. 9 is a flow chart showing a series of processing steps in the vehicle periphery monitoring device shown in FIG. 8.

As shown in the block diagram of FIG. 7, the vehicle periphery monitoring device according to the embodiment includes the imaging unit 810 such as N CCD cameras or C-MOS cameras which observe different directions respectively, the brightness correction unit 820 which corrects brightness of images inputted by the imaging units 810, the coordinate transformation and image combining unit 900 which performs coordinate transformation on the images outputted from the brightness correction unit 820 and further combines the images to a single image, the image brightness calculation unit 1000 which calculates brightness of captured images, the image display unit 1100 including a monitor, etc., which shows the result of coordinate transformation/image combination performed, a start/end instruction detection unit 1200 which detects an instruction to start or end the vehicle periphery monitoring device, and an imaging-unit-selecting unit 1300 which selects one imaging unit from multiple imaging units 810. In addition, this vehicle periphery monitoring device is mounted on a vehicle not shown in FIG. 7.

The embodiment is described taking, as an example, a case where the imaging unit 810 includes four cameras. That is to say, the imaging unit 810 includes a front camera 811 for observing the forward direction of a vehicle and a first decoder and brightness correction unit 812 and a first A/D converter 813 connected thereto, a left side camera 821 for observing the left direction of the vehicle and a second decoder and brightness correction unit 822 and a second A/D converter 823 connected thereto, a right side camera 831 for observing the right direction of the vehicle and a third decoder and brightness correction unit 832 and a third A/D converter 833 connected thereto, and a rear camera 841 for observing the backward direction of the vehicle and a fourth decoder and brightness correction unit 842 and a fourth A/D converter 843 connected thereto.

In addition, the coordinate transformation and image combining unit 900 includes a coordinate transformation unit 901, a coordinate transformation table 902, and an image combining unit 908.

The image brightness calculation unit 1000 includes a first brightness calculation unit 1001 connected to the first A/D converter 813, a second brightness calculation unit 1002 connected to the second A/D converter 823, a third brightness calculation unit 1003 connected to the third A/D converter 888, and a fourth brightness calculation unit 1004 connected to the fourth A/D converter 843.

Furthermore, the image display unit 1100 includes a D/A converter 1101, an encoder 1102, and a monitor 1103.

Figure 10A:
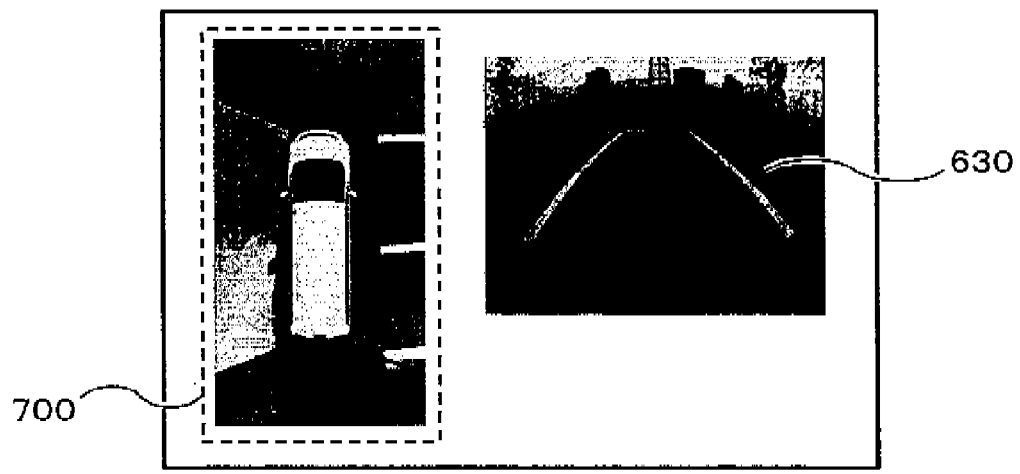
FIG. 10A is a view showing one example of images behind a vehicle which are created in the second embodiment and a third embodiment and presented to a driver.
Figure 10B:
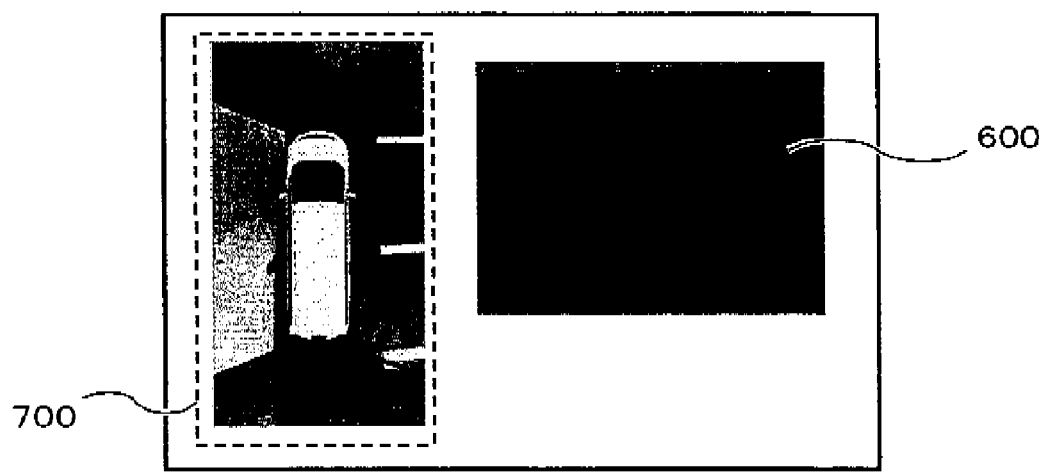
FIG. 10B is a view showing one example of images in front of a vehicle which are created in the second embodiment and the third embodiment and presented to a driver.

The vehicle periphery monitoring device in the embodiment is configured to display, as a single image on the monitor 1108, one composite image 700 in which 360° information pieces on a vehicle periphery are combined and an image 630 taken by the rear camera 841, as shown in FIG. 10A, or one composite image 700 in which 360° information pieces on the vehicle periphery are combined and an image 600 taken by the front camera 811, as shown in FIG. 10B.

Figure 12A:
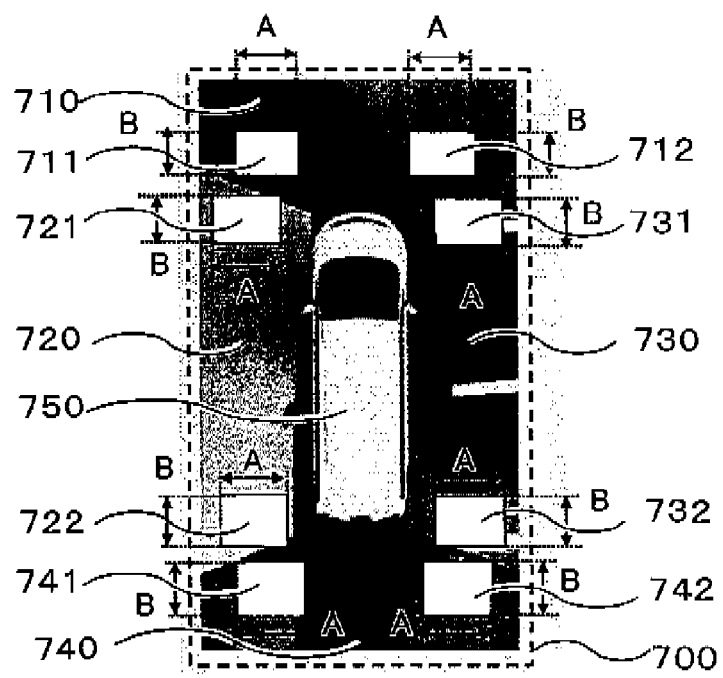
FIG. 12A is a view illustrating a method for calculating image brightness to be calculated by the first brightness calculation unit, a second brightness calculation unit, a third brightness calculation unit, and a fourth brightness calculation unit in FIG. 8 in the second embodiment of the present invention, and by a first brightness calculation unit, a second brightness calculation unit, a third brightness calculation unit and a fourth brightness calculation unit in FIG. 14 in the third embodiment of the present invention.
Figure 12B:
FIG. 12B is a view showing an example in which predetermined areas for brightness correction are set in an image taken by a front camera.

Now, as shown in FIG. 12A, the composite image 700 is a single image obtained by combining an image 710 looking down at the image 600 taken by the front camera 811 from an overhead virtual viewing point V, an image 720 looking down at an image 610 taken by the left side camera 821 from the overhead virtual viewing point V, an image 730 looking down at an image 620 taken by the right side camera 831 from the overhead virtual viewing point V, an image 740 looking down at an image 630 taken by the rear camera 841 from the overhead virtual viewing point V, and a virtual image 750 looking down at the vehicle from the overhead viewing point V.

In addition, although the embodiment is configured to observe the four directions of a vehicle, the number of directions to observe is not limited to this, and the embodiment may be configured to observe more directions. Even in such a case, the present invention can still be implemented with the operation similar to the embodiment.

The operation of the vehicle periphery monitoring device according to the embodiment will be described hereinafter with reference to the flow chart of FIG. 9.

The front camera 811, the left side camera 821, the right side camera 831, and the rear camera 841 are mounted on the vehicle in a layout in which imaging ranges of adjacent cameras (the front camera 811 and the left side camera 821, the front camera 811 and the right side camera 831, the left side camera 821 and the rear camera 841, and the right side camera 831 and the rear camera 841) partly overlap.

The start/end instruction detection unit 1200 detects that a shift position is in a retreated position or that the shift position is in an advance position and a vehicle speed is equal to or less than a predetermined value (S2, S3, S4 of FIG. 9), the coordinate transformation unit 901 generates a trigger signal. The trigger signal is inputted to the first decoder and brightness correction unit 812, the first A/D converter 813, the second decoder and brightness correction unit 822, the second A/D converter 823, the third decoder and brightness correction unit 832, the third A/D converter 833, the fourth decoder and brightness correction unit 842, and the fourth A/D converter 843.

When each camera receives the trigger signal, the front camera 813, the left side camera 821, the right side camera 831, and the rear camera 841 simultaneously input an image (S7 of FIG. 9).

The image inputted from the front camera 811 is converted from composite signals into component signals by the first decoder and brightness correction unit 812 (S8 of FIG. 9). Furthermore, a luminance signal of the converted component signals is converted into a digital signal by the first A/D converter 813 and the image 600 is generated (S10 of FIG. 9). Similarly, the image inputted from the left side camera 821 is converted from the composite signals into the component signals (S8 of FIG. 9). Furthermore, the luminance signal of the converted component signals is converted into a digital signal by the second A/D converter 823 and the image 610 is generated (S10 of FIG. 9). The image inputted from the right side camera 831 is converted from the composite signals into the component signals by the third decoder and the brightness correction unit 832 (S8 of FIG. 9). Furthermore, the luminance signal of the converted composite signals is converted into a digital signal by the third A/D converter 833, and the image 620 is generated (S10 of FIG. 9). The image inputted from the rear camera 841 is converted from the composite signals into the component signals by the fourth decoder and brightness correction unit 842 (S8 of FIG. 9). Furthermore, the luminance signal of the converted component signal is converted into a digital signal by the fourth A/D converter 843, and the image 630 is generated (S10 of FIG. 9).

In addition, now, brightness of the inputted image is corrected (S9 of FIG. 9) at the same time when the signal is converted from the composite signal into the component signal. However, as a correction amount for correcting brightness of the image has not been calculated, the brightness correction is not performed when an initial image after starting of the vehicle periphery monitoring device is inputted, the bright correction is not performed.

Next, the imaging-unit-selecting unit 1300 determines whether to display the image 630 captured for the backward direction of the vehicle as in FIG. 10A, or the image 600 captured for the forward direction of the vehicle as in FIG. 10B, as an image to be outputted to the monitor 1103.

This is determined based on the result of monitoring of a shift position and vehicle speed by the start/end instruction detection unit 1200.

That is to say, if the shift position is in the retreated position, the image 630 captured for the backward direction of the vehicle is displayed in the area to the right of the image shown in FIG. 10A (S2 of FIG. 9). Or, if the shift position is in the advance position and the vehicle speed is equal to or less than the predetermined value, the image 600 captured for the forward direction of the vehicle is displayed in the area to the right of the image in FIG. 10B (S3, S4 of FIG. 9). Now, if it is determined that the image 630 captured for the backward direction of the vehicle is displayed, the rear camera 841 is selected (S6 of FIG. 9), while if it is determined that image 600 captured for the forward direction of the vehicle is displayed, the front camera 811 is selected (S5 of FIG. 9). A brightness correction procedure to be described later differs depending on which camera is selected.

First, the operation when the rear camera 841 is selected by the imaging-unit-selecting unit 1300 will be described.

The fourth brightness calculation unit 1004 calculates an average value of pixel values in a predetermined area in the image 630 taken by the rear camera 841 (S11 of FIG. 9). Now, as shown in FIG. 5, an area consisting of m pixels in a horizontal direction and n pixels in a vertical direction is set at a predetermined position (x0, y0) and an average value I ave of all pixels in that area is calculated.

Then, the first brightness calculation unit 1001 calculates an average value of pixels in the image 600 generated in S7 of FIG. 9 (S12 of FIG. 9). Now, as shown in FIG. 6B, an area 601 and an area 602 of a predetermined size are set in prescribed positions which have been determined in advance, and an average value I 1ave of all the pixels in the area 601, the area 602 is calculated.

Now, the area 601 is an area to be converted into a rectangular area 711 having a size of width A and length B at a position where the imaging ranges of the front camera 811 and the left side camera 821 overlap or in the vicinity thereof, when the image 600 is converted into the image 710 looking down from the overhead virtual viewing point V. Furthermore, the area 602 is an area to be converted into a rectangular area 712 having a size of width A and length B at a position where the imaging ranges of the front camera 811 and the right side camera 831 overlap or in the vicinity thereof, when the image 600 is converted into the image 710 looking down from the overhead virtual viewing point V.

In addition, the positions of the area 601 and the area 602 can be determined in advance by calculations. The calculated positions of the areas are stored in advance in the first brightness calculation unit 1001.

Next, the second brightness calculation unit 1002 calculates an average value of pixel values in the predetermined areas in the image 610 generated in S7 of FIG. 9 (S12 of FIG. 9). Here, as shown in FIG. 6C, an area 611 and an area 612 of a predetermined size are set at prescribed positions in the image 610 which have been determined in advance, and an average value I 2ave of all the pixel values in the area 611 and the area 612 is calculated.

Now, the area 611 is an area to be converted into a rectangular area 721 having a size of width A and length B at a position where the imaging ranges of the front camera 811 and the left side camera 821 overlap or in the vicinity thereof, when the image 610 is converted into the image 720 looking down from the overhead virtual viewing point V. Furthermore, the area 612 is an area to be converted into a rectangular area 722 having a size of width A and length B at a position where the imaging ranges of the left side camera 821 and the rear camera 841 overlap or in the vicinity thereof, when the image 610 is converted into the image 720 looking down from the overhead virtual viewing point V.

In addition, the positions of the area 611 and the area 612 can be determined in advance by calculations. The calculated positions of the areas are stored in advance in the second brightness calculation unit 1002.

Further, the third brightness calculation unit 1003 calculates an average value of pixel values in predetermined areas in the image 620 generated in S7 of FIG. 9. Here, as shown in FIG. 6D, an area 621 and an area 622 of a predetermined size are set at prescribed positions which have been determined in advance, and an average value I 3ave of all the pixel values in the area 621 and the area 622 is calculated.

Now, the area 621 is an area to be converted into a rectangular area 731 having a size of width A and length B at a position where the imaging ranges of the front camera 811 and the right side camera 831 overlap or in the vicinity thereof, when the image 620 is converted into the image 730 looking down from the overhead virtual viewing point V. Furthermore, the area 622 is an area to be converted into a rectangular area 732 having a size of width A and length B at a position where the imaging ranges of the right side camera 831 and the rear camera 841 overlap or in the vicinity thereof, when the image 620 is converted into the image 730 looking down from the overhead virtual viewing point V.

In addition, the positions of the area 621 and the area 622 can be determined in advance by calculations. The calculated positions of the areas are stored in advance in the third brightness calculation unit 1003.

The calculated I ave and I 1ave are transmitted to the first decoder and brightness correction unit 812 and stored therein. Similarly, I ave and I 2ave are transmitted to the second decoder and brightness correction unit 822 and stored therein, and I ave and I 3ave are transmitted to the third decoder and brightness correction unit 832 and stored therein. In addition, since no brightness correction is performed on images to be inputted from the rear camera 841, w=0 is stored in the fourth decoder and brightness correction unit 842.

The image 600, the image 610, the image 620, and the image 630 which have been generated in S7 of FIG. 3 are coordinate transformed by the coordinate transformation unit 901 and converted into an image looking down from the overhead virtual viewing point V (S13 of FIG. 9). The coordinate transformation process is calculated based on camera parameters such as geometric layout of each camera mounted on the vehicle or a focal length of the camera, pixel size, etc. and parameters such as a position of the virtual viewing point V or observation range, etc. However, in general, the coordinate transformation process is performed by creating the coordinate transformation table 902 in advance based on camera parameters such as geometric layout of each camera mounted on the vehicle or a focal length of the camera, pixel size, etc. and parameters such as a position of the virtual viewing point V or observation range, etc., and then replacing coordinates of the inputted images on the basis of this coordinate transformation table 902.

Through the coordinate transformation, the image 600 taken by the front camera 811 is converted into the image 710, the image 610 taken by the left side camera 821 is converted into the image 720, the image 620 taken by the right side camera 831 is converted into the image 730, and the image 630 taken by the rear camera 841 is converted into the image 740. The converted results are combined into a single image by the image combining unit 903, and further a virtual image 750 looking down at the own vehicle from the overhead virtual viewing point V is combined therewith and a composite image 700 is generated. Furthermore, the composite image 700 is combined with the image 630 taken by the rear camera 841 and a single image shown in FIG. 10A is created (S14 of FIG. 9).

The created image is reconstructed to component signals by the D/A converter 1101 (S15 of FIG. 9), further converted into composite signals by the encoder 1102 (S15 of FIG. 9), and displayed to the monitor 1103 (S17 of FIG. 9).

The start/end instruction detection unit 1200 detects whether or not a shift position is in a retreated position (S18, S19 of FIG. 9). If the shift position is in any position other than the retreated position, the display on the monitor 1103 is cancelled (S21 of FIG. 9).

If it is confirmed that the shift position is in the retreated position, the image is inputted again in S7 of FIG. 9.

The image inputted from the front camera 811 is converted from composite signals into component signals by the first decoder and brightness correction unit 812 (S8 of FIG. 9), and then, brightness is corrected based on I ave and I 1ave which have been stored in the first decoder and brightness correction unit 812 (S9 of FIG. 9).

Specifically, if a currently set brightness value in the first decoder and brightness correction unit 812 is B1, and a newly set brightness value by brightness correction is B1', correction of brightness is performed by calculating a new brightness value B1' by (Formula 1).

Images taken by the left side camera 821 or the right side camera 831 are also brightness corrected as described below.

That is to say, if a currently set brightness value in the second decoder and brightness correction unit 822 is B2, a newly set brightness value by the brightness correction is B2', a currently set brightness value in the third decoder and brightness correction unit 832 is B3, and a newly set brightness value by the brightness correction is B3', the image taken by the left side camera 821 is brightness corrected by the new brightness value B2' to be calculated by (Formula 2), and the image taken by the right side camera 831 is brightness corrected by the new brightness value B3' to be calculated by (Formula 3).

In addition, since an image taken by the rear camera is a reference image for performing image brightness correction, the image itself is not brightness corrected. Thus, w=0 is stored in the fourth decoder and brightness correction unit 842. That is to say, if a currently set brightness value in the fourth decoder and brightness correction unit 842 is B4, and a newly set brightness value by the brightness correction is B4', the new brightness value B4' is calculated by (Formula 4) and brightness corrected.

The images with the brightness thereof corrected by (Formula 1), (Formula 2), (Formula 3), and (Formula 4) are converted into digital signals by the first A/D converter 813, the second A/D converter 823, the third A/D converter 833, and the fourth A/D converter 843, and an image 600, an image 610, an image 620, and an image 630, which are new, with the brightness thereof corrected are generated (S9 of FIG. 10).

For the image 600, the image 610, the image 620, and image 680, which are new, with the brightness thereof thus corrected, the image brightness calculation unit 1000 calculates I ave, I 1ave, I 2ave, and I 3ave again.

Of I ave, I 1ave, I 2ave, and I 3ave which have been thus calculated, I ave and I 1ave are transmitted to the first decoder and brightness correction unit 812 and stored therein. In addition, I ave and I 2ave are transmitted to the second decoder and brightness correction unit 822 and stored therein. Furthermore, I ave and I 3ave are transmitted to the third decoder and brightness correction unit 832 and stored therein.

Since no brightness correction is performed on the image 630, w=0 is stored in the fourth decoder and brightness correction unit 842.

Next, a coordinate transformation process and an image combining process are performed on the brightness corrected images. After being subjected to D/A conversion, the composite images are converted into composite signals by the encoding process and outputted to the monitor 1103.

Subsequently, as far as the shift position is in the retreated position, the processes mentioned above are continuously performed. Every time they are performed, brightness of the images is corrected based on the calculated newest brightness value.

The operation when the imaging-unit-selecting unit 1300 selects the front camera 811 will be described hereinafter.

Figure 11:
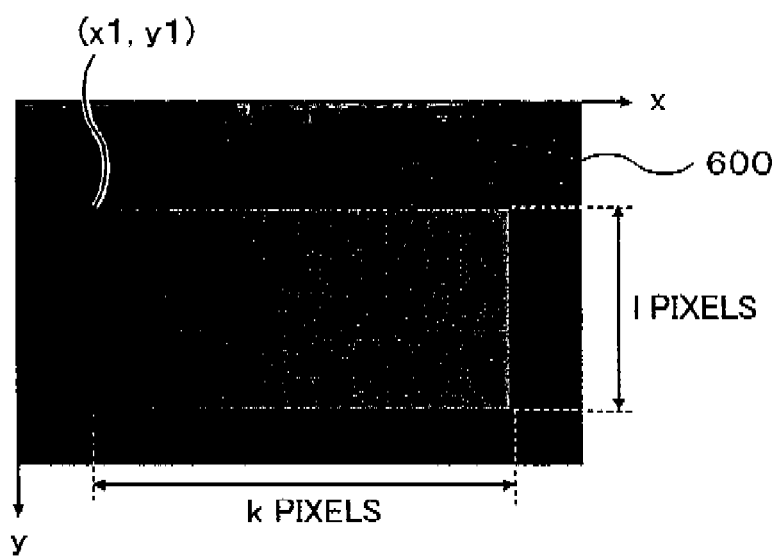
FIG. 11 is a view illustrating a method for calculating image brightness to be calculated by a first brightness calculation unit in the second embodiment of the present invention.

The first brightness calculation unit 1001 calculates an average value of pixel values in the predetermined areas in the image 600 taken by the front camera 811 (S11 of FIG. 9). Now, as shown in FIG. 11, an area consisting of k pixels in a horizontal direction and l pixels in a vertical direction is set at a predetermined position (x1, y1) and an average value I ave of all pixels in that area is calculated.

Figure 12C:
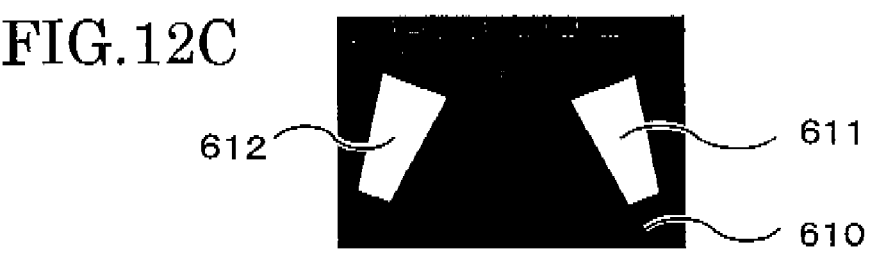
FIG. 12C is a view showing an example in which predetermined areas for brightness correction are set in an image taken by a left side camera.

Then, the second brightness calculation unit 1002 calculates an average value of pixels in the image 610 generated in S7 of FIG. 9 (S12 of FIG. 9). Now, as shown in FIG. 12C, an area 611 and an area 612 of a predetermined size are set in prescribed positions which have been determined in advance, and an average value I 2ave of all the pixels in the area 611, the area 612 is calculated.

Now, as shown in FIG. 12A, the area 611 is an area to be converted into a rectangular area 721 having a size of width A and length B at a position where the imaging ranges of the front camera 811 and the left side camera 821 overlap or in the vicinity thereof, when the image 610 is converted into the image 720 looking down from the overhead virtual viewing point V. Furthermore, the area 612 is an area to be converted into a rectangular area 722 having a size of width A and length B at a position where the imaging ranges of the left side camera 821 and the rear camera 841 overlap or in the vicinity thereof, when the image 610 is converted into the image 720 looking down from the overhead virtual viewing point V.

In addition, the positions of the area 611 and the area 612 can be determined in advance by calculations. The calculated positions of the areas are stored in advance in the second brightness calculation unit 1002.

Figure 12D:
FIG. 12D is a view showing an example in which predetermined areas for brightness correction are set in an image taken by a right side camera.

Next, the third brightness calculation unit 1003 calculates an average value of pixel values in the predetermined areas in the image 620 generated in S7 of FIG. 9 (S12 of FIG. 9). Here, as shown in FIG. 12D, an area 621 and an area 622 of a predetermined size are set at prescribed positions in the image 620 which have been determined in advance, and an average value I 3ave of all the pixel values in the area 621 and the area 622 is calculated.

Now, as shown in FIG. 12A, the area 621 is an area to be converted into a rectangular area 731 having a size of width A and length B at a position where the imaging ranges of the front camera 811 and the right side camera 831 overlap or in the vicinity thereof, when the image 620 is converted into the image 730 looking down from the overhead virtual viewing point V. Furthermore, the area 622 is an area to be converted into a rectangular area 732 having a size of width A and length B at a position where the imaging ranges of the right side camera 831 and the rear camera 841 overlap or in the vicinity thereof, when the image 620 is converted into the image 730 looking down from the overhead virtual viewing point V.

In addition, the positions of the area 621 and the area 622 can be determined in advance by calculations. The calculated positions of the areas are stored in advance in the third brightness calculation unit 1003.

Figure 12E:
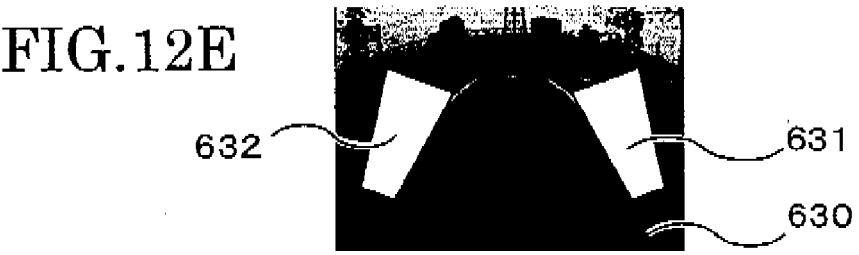
FIG. 12E is a view showing an example in which predetermined areas for brightness correction are set in an image taken by a rear camera.

Next, the fourth brightness calculation unit 1004 calculates an average value of pixel values in the predetermined areas in the image 630 generated in S7 of FIG. 9 (S12 of FIG. 9). Here, as shown in FIG. 12E, an area 631 and an area 632 of a predetermined size are set at prescribed positions in the image 630 which have been determined in advance, and an average value I 4ave of all the pixel values in the area 631 and the area 632 is calculated.

Now, as shown in FIG. 12A, the area 631 is an area to be converted into a rectangular area 741 having a size of width A and length B at a position where the imaging ranges of the rear camera 841 and the left side camera 821 overlap or in the vicinity thereof, when the image 630 is converted into the image 740 looking down from the overhead virtual viewing point V. Furthermore, the area 632 is an area to be converted into a rectangular area 742 having a size of width A and length B at a position where the imaging ranges of the right side camera 831 and the rear camera 841 overlap or in the vicinity thereof, when the image 630 is converted into the image 740 looking down from the overhead virtual viewing point V.

In addition, the positions of the area 631 and the area 682 can be determined in advance by calculations. The calculated positions of the areas are stored in advance in the fourth brightness calculation unit 1004.

I ave and I 1ave which have been calculated are transmitted to the second decoder and brightness correction unit 822 and stored therein. Similarly, I ave and I 3ave are transmitted to the third decoder and brightness correction unit 832 and stored therein, and I ave and I 4ave are transmitted to the fourth decoder and brightness correction unit 842 and stored therein. Since no brightness correction is performed on an image taken by the front camera 811, w=0 is stored in the fifth decoder and brightness correction unit 812.

The image 600, the image 610, the image 620, and the image 630 which have been generated in S7 of FIG. 9 are coordinate transformed by the coordinate transformation unit 901 and converted into an image looking down from the overhead virtual viewing point V (S13 of FIG. 9). The coordinate transformation process is calculated based on camera parameters such as geometric layout of each camera mounted on the vehicle or a focal length of the camera, pixel size, etc. and parameters such as a position of the virtual viewing point V or observation range, etc. However, in general, the coordinate transformation process is performed by creating the coordinate transformation table 902 in advance based on camera parameters such as geometric layout of each camera mounted on the vehicle or a focal length of the camera, pixel size, etc. and parameters such as a position of the virtual viewing point V or observation range, etc., and then replacing coordinates of the inputted images on the basis of this coordinate transformation table 902.

Through the coordinate transformation, the image 600 is converted into the image 710, the image 610 is converted into the image 720, the image 620 is converted into the image 730, and the image 630 is converted into the image 740. The converted results are combined into a single image by the image combining unit 903, and further a virtual image 750 looking down at the own vehicle from the overhead virtual viewing point V is combined therewith and a composite image 700 is generated. Furthermore, the composite image 700 is combined with the image 600 taken by the front camera 811 and a single image shown in FIG. 10B is created (S14 of FIG. 9).

The created image is reconstructed to component signals by the D/A converter 1101 (S15 of FIG. 9), further converted into composite signals by the encoder 1102 (S15 of FIG. 9), and displayed to the monitor 1103 (S17 of FIG. 9).

The start/end instruction detection unit 1200 judges that the front camera 811 is in a selected state and a vehicle speed is equal to or less than a predetermined value (S18, S20 of FIG. 9). If the condition is not matched, the display on the monitor 1103 is cancelled (S21 of FIG. 9).

On the other hand, if it is judged that the condition is matched, image is inputted once again in S7 of FIG. 9.

The image taken by the rear camera 841 is converted from composite signals into component signals by the first decoder and brightness correction unit 842 (S8 of FIG. 9), and then, brightness is corrected based on I ave and I 4ave which have been stored in the fourth decoder and brightness correction unit 842 (S9 of FIG. 9).

Specifically, if a currently set brightness value in the fourth decoder and brightness correction unit 842 is B4, and a newly set brightness value by brightness correction is B4', B4' is calculated by (Formula 5) and thereby brightness is corrected.

$$B4'=B4+(I\text{ ave}-I\text{ 4ave})\times w \quad \text{(Formula 5)}$$

Images taken by the left side camera 821 or the right side camera 831 are also brightness corrected as described below.

That is to say, if a currently set brightness value in the second decoder and brightness correction unit 822 is B2, a newly set brightness value by the brightness correction is B2', a currently set brightness value in the third decoder and brightness correction unit 832 is B3, and a newly set brightness value by the brightness correction is B3', the image taken by the left side camera 821 is brightness corrected by the new brightness value B2' to be calculated by (Formula 2), and the image taken by the right side camera 831 is brightness corrected by the new brightness value B3' to be calculated by (Formula 3).

In addition, since no brightness correction is performed on an image taken by the front camera, w=0 is stored in the first decoder and brightness correction unit 812. That is to say, if the currently set brightness value in the first decoder and brightness correction unit 812 is B1 and the newly set brightness value by the brightness correction is B1', B1' is calculated in the (Formula 6).

$$B1'=B1 \quad \text{(Formula 6)}$$

The images with the brightness thereof corrected by (Formula 2), (Formula 3), (Formula 5), and (Formula 6) are converted into digital signals by the first A/D converter 813, the second A/D converter 823, the third A/D converter 833, and the fourth A/D converter 843, and an image 600, an image 610, an image 620, and an image 680, which are new, with the brightness thereof corrected are generated (S10 of FIG. 9).

For the image 600, the image 610, the image 620, and image 630, which are new, with the brightness thereof thus corrected, the image brightness calculation unit 1000 calculates I ave, I 2ave, I 3ave, and I 4ave again.

Of I ave, I 2ave, I 3ave, and I 4ave which have been thus calculated, I ave and I 2ave are transmitted to the second decoder and brightness correction unit 822 and stored therein. In addition, I ave and I 3ave are transmitted to the third decoder and brightness correction unit 832 and stored therein. Furthermore, I ave and I 4ave are transmitted to the fourth decoder and brightness correction unit 842 and stored therein. Since no brightness correction is performed on the image 600 inputted from the front camera 811, w=0 is stored in the first decoder and brightness correction unit 812.

Next, a coordinate transformation process and an image combining process are performed on the brightness corrected images. After being subjected to D/A conversion, the composite image signals are converted into composite signals by the encoding process and outputted to the monitor 1103.

Subsequently, as far as the shift position is in the advance position and a vehicle speed is less than or equal to a predetermined value, the above process is continuously performed. Every time it is performed, brightness of the images is corrected based on the calculated newest brightness value.

Since the result of image brightness correction does not affect brightness of an image in a traveling direction of the vehicle to which most attention should be paid during driving, it is possible to provide drivers information useful for safety confirmation around a vehicle.

In addition, the operation of the vehicle periphery monitoring device of the embodiment described above corresponds to an embodiment of a vehicle periphery image display method according to the present invention.

Embodiment 3

Figure 13:
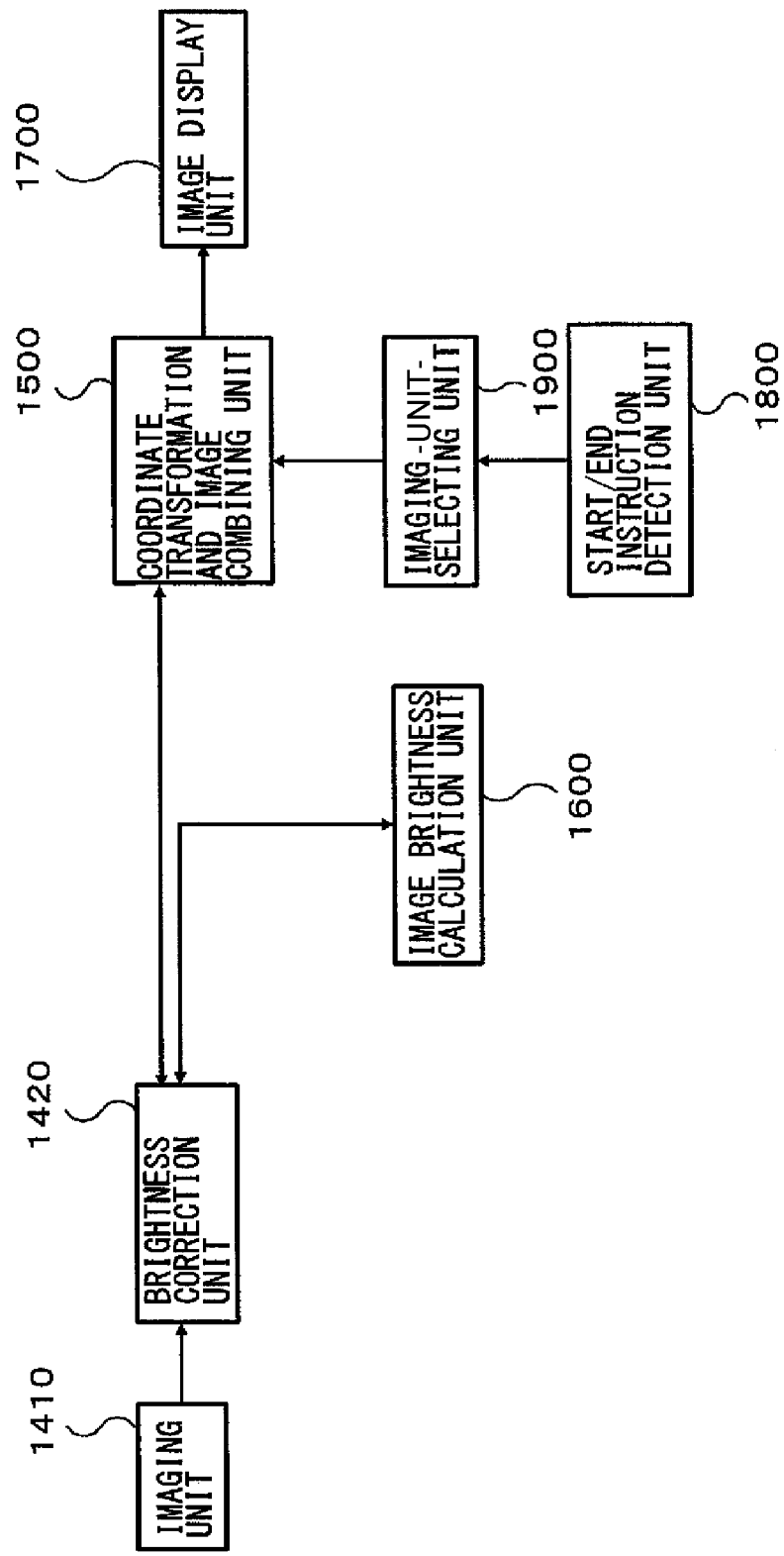
FIG. 13 is a block diagram showing a schematic configuration of a vehicle periphery monitoring device of the third embodiment of the present invention.

FIG. 13 is a block diagram showing a schematic configuration of a third embodiment of a vehicle periphery monitoring device according to the present invention.

Figure 14:
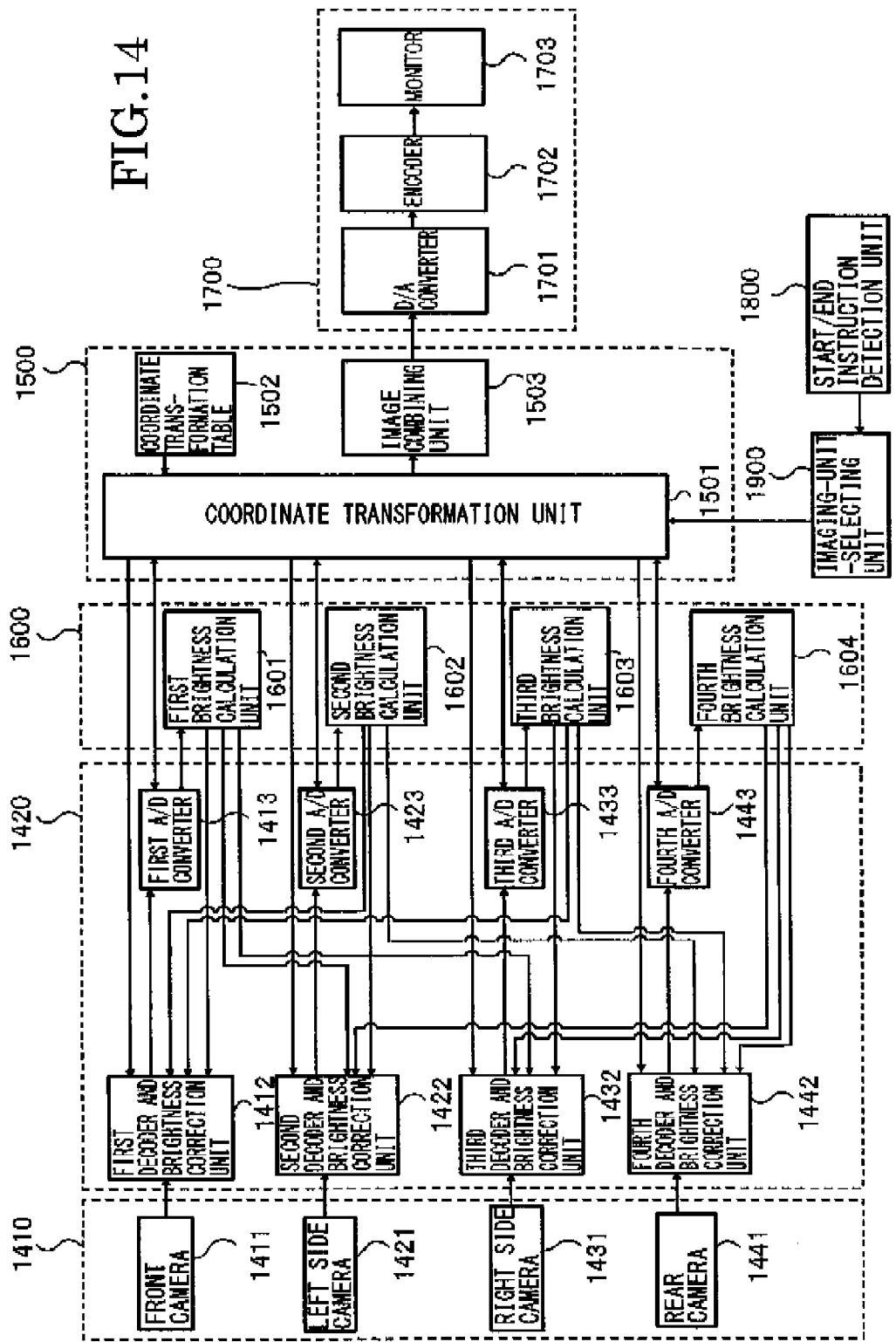
FIG. 14 is a block diagram showing a detailed configuration of an imaging unit, a brightness correction unit, a coordinate transformation and image combining unit, an image brightness calculation unit, and an image display unit.

FIG. 14 is a block diagram showing a detailed configuration of an imaging unit 1410, a brightness correction unit 1420, a coordinate transformation and image combining unit 1500, an image brightness calculation unit 1600, and an image display unit 1700.

Figure 15:
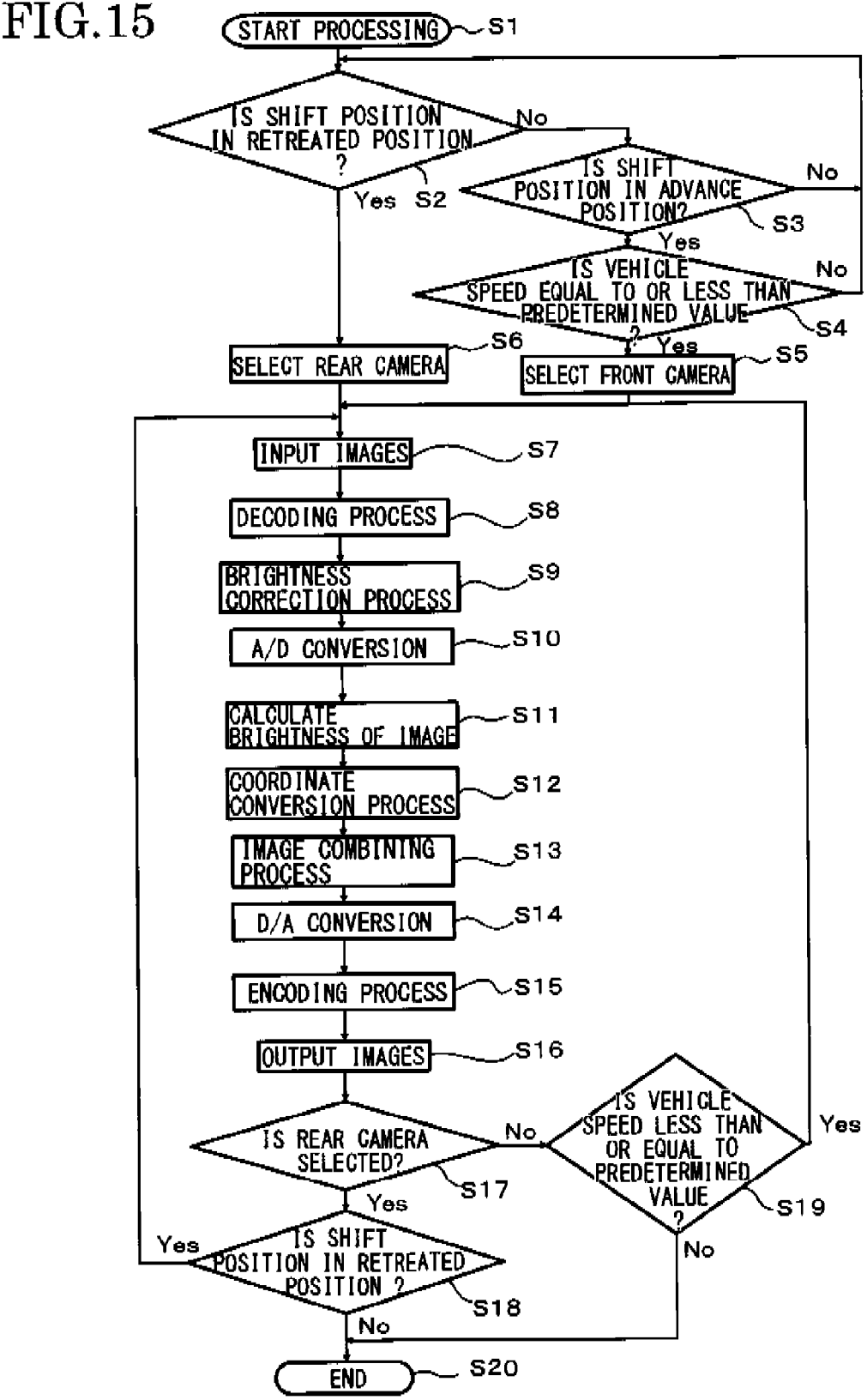
FIG. 15 is a flow chart showing a series of processing steps in the vehicle periphery monitoring device shown in FIG. 13 and FIG. 14.

FIG. 15 is a flow chart showing a series of processing steps in a vehicle periphery monitoring device shown in FIG. 13 and FIG. 14.

As shown in the block diagram of FIG. 13, the vehicle periphery monitoring device according to the embodiment includes the imaging unit 1410 such as N CCD cameras or C-MOS cameras which are mounted on a vehicle and observe different directions respectively, the brightness correction unit 1420 which corrects brightness of images inputted by the imaging units 1410, the coordinate transformation and image combining unit 1500 which performs coordinate transformation on the images outputted from the brightness correction unit 1420 and further combines the images to a single image, the image brightness calculation unit 1600 which calculates brightness of captured images, the image display unit 1700 including a monitor, etc., which shows the result of coordinate transformation/image combination performed, a start/end instruction detection unit 1800 which detects an instruction to start or end the vehicle periphery monitoring device, and an imaging-unit-selecting unit 1900 which selects one imaging unit from multiple imaging units 1410.

The embodiment is described taking, as an example, a case where the imaging unit 1410 includes four cameras. That is to say, the imaging unit 1410 includes a front camera 1411 for observing the forward direction of a vehicle and a first decoder and brightness correction unit 1412 and a first A/D converter 1413 connected thereto, a left side camera 1421 for observing the left direction of the vehicle and a second decoder and brightness correction unit 1422 and a second A/D converter 1423 connected thereto, a right side camera 1431 for observing the right direction of the vehicle and a third decoder and brightness correction unit 1432 and a third A/D converter 1433 connected thereto, and a rear camera 1441 for observing the backward direction of the vehicle and a fourth decoder and brightness correction unit 1442 and a fourth A/D converter 1443 connected thereto.

In addition, the coordinate transformation and image combining unit 1500 includes a coordinate transformation unit 1501, a coordinate transformation table 1502, and an image combining unit 1503.

The image brightness calculation unit 1600 includes a first brightness calculation unit 1601 connected to the first A/D converter 1413, a second brightness calculation unit 1602 connected to the second A/D converter 1423, a third brightness calculation unit 1603 connected to the third A/D converter 1433, and a fourth brightness calculation unit 1604 connected to the fourth A/D converter 1443.

Furthermore, the image display unit 1700 includes a D/A converter 1701, an encoder 1702, and a monitor 1703.

The vehicle periphery monitoring device in the embodiment is configured to display, as a single image on the monitor 1703, one composite image 700 in which 360° information pieces on a vehicle periphery are combined and an image 630 taken by the rear camera 1411, as shown in FIG. 10A, or one composite image 700 in which 360' information pieces on the vehicle periphery are combined and an image 600 taken by the front camera 1441, as shown in FIG. 10B.

Now, the composite image 700 is a single image obtained by combining an image 710 looking down at the image 600 taken by the front camera 1411 from an overhead virtual viewing point V, an image 720 looking down at an image 610 taken by the left side camera 1421 from the overhead virtual viewing point V, an image 730 looking down at an image 620 taken by the right side camera 1431 from the overhead virtual viewing point V, an image 740 looking down at an image 630 taken by the rear camera 1441 from the overhead virtual viewing point V, and a virtual image 750 looking down at the vehicle from the overhead viewing point V.

In addition, although the embodiment is configured to observe the four directions of a vehicle, the number of directions to observe is not limited to this, and the embodiment may be configured to observe more directions. Even in such a case, the present invention can still be implemented with the operation similar to the embodiment.

The operation of the vehicle periphery monitoring device according to the embodiment will be described hereinafter with reference to the flow chart of FIG. 15.

The front camera 1411, the left side camera 1421, the right side camera 1431, and the rear camera 1441 are mounted on the vehicle in a layout in which imaging ranges of adjacent cameras (the front camera 1411 and the left side camera 1421, the front camera 1411 and the right side camera 1431, the left side camera 1421 and the rear camera 1441, and the right side camera 1431 and the rear camera 1441) partly overlap.

The start/end instruction detection unit 1800 detects that a shift position is in a retreated position or that the shift position is in an advance position and a vehicle speed is less than or equal to a predetermined value (S2, S3, S4 of FIG. 15), the coordinate transformation unit 1501 generates a trigger signal. The trigger signal is inputted to the first decoder and brightness correction unit 1412, the first A/D converter 1413, the second decoder and brightness correction unit 1422, the second A/D converter 1423, the third decoder and brightness correction unit 1432, the third A/D converter 1433, the fourth decoder and brightness correction unit 1442, and the fourth A/D converter 1443.

When the trigger signal is received, images are simultaneously inputted from the front camera 1411, the left side camera 1421, the right side camera 1431, and the rear camera 1411 (S7 of FIG. 15).

The image inputted from the front camera 1411 is converted from composite signals into component signals by the first decoder and brightness correction unit 1412 (S8 of FIG. 15). Furthermore, a luminance signal of the converted component signals is converted into a digital signal by the first A/D converter 1413 and the image 600 is generated (S10 of FIG. 15). Similarly, the image inputted from the left side camera 1421 is converted from the composite signals into the component signals the second decoder and brightness correction unit 1422 (S8 of FIG. 15). Furthermore, the luminance signal of the converted component signals is converted into a digital signal by the second A/D converter 1423 and the image 610 is generated (S10 of FIG. 15). The image inputted from the right side camera 1431 is converted from the composite signals into the component signals by the third decoder and the brightness correction unit 1432 (S8 of FIG. 15). Furthermore, the luminance signal of the converted composite signals is converted into a digital signal by the third A/D converter 1433, and the image 620 is generated (S10 of FIG. 15). The image inputted from the rear camera 1441 is converted from the composite signals into the component signals by the fourth decoder and brightness correction unit 1441 (S8 of FIG. 15). Furthermore, the luminance signal of the converted component signal is converted into a digital signal by the fourth A/D converter 1443, and the image 630 is generated (S10 of FIG. 15).

In addition, now, brightness of the inputted image is corrected (S9 of FIG. 9) at the same time when the signal is converted from the composite signal into the component signal. However, as a correction amount for correcting brightness of the image has not been calculated, the brightness correction is not performed when an initial image after starting of the vehicle periphery monitoring device is inputted, the bright correction is not performed.

Next, the imaging-unit-selecting unit 1900 determines whether to display the image 630 captured for the backward direction of the vehicle or the image 600 captured for the forward direction of the vehicle, as an image to be outputted to the monitor 1103, in the area to the right of the composite image 700.

This is determined based on the result of monitoring of a shift position and vehicle speed by the start/end instruction detection unit 1800.

That is to say, if the shift position is in the retreated position, the image 630 captured for the backward direction of the vehicle is displayed in the area to the right of the composite image 700, as shown in FIG. 10A. Alternatively, if the shift position is in the advance position and the vehicle speed is less than or equal to the predetermined value, the image 600 captured for the forward direction of the vehicle is displayed in the area to the right of the composite image 700, as shown in FIG. 10B. Now, if it is determined to display the image 630, the rear camera 1441 is selected (S6 of FIG. 15), while if it is determined to display the image 600, the front camera 1411 is selected (S5 of FIG. 15). A brightness correction procedure to be described later differs depending on which camera is selected.

First, the operation when the rear camera 1441 is selected by the imaging-unit-selecting unit 1900 will be described.

First, as shown in FIG. 12B, FIG. 12C, FIG. 12D, and FIG. 12E, the fourth brightness calculation unit 1604 calculates an average value I a_ave of all pixels in the area 601, an average value I b_ave of all pixel values of the area 602, an average value I c_ave of all pixel values in the area 611, an average value I d_ave of all pixel values in the area 612, an average value I e_ave of all pixel values in the area 621, an average value I f_ave of all pixel values in the area 622, an average value I g_ave of all pixel values in the area 631 and an average value I h_ave of all pixel values in the area 632, respectively, which have been set in prescribed size and in predetermined positions in the image 600, the image 610, the image 620 and the image 630.

Now, as shown in FIG. 12A, the area 601, the area 60, the area 611, the area 612, the area 621, the area 622, the area 631, and the area 632 are areas, to be respectively converted into a rectangular area 711, a rectangular area 712, a rectangular area 721, a rectangular area 722, a rectangular area 731, a rectangular area 732, a rectangular area 741, and a rectangular area 742 which have a size of width A and length B and which are located in a position where imaging ranges of adjacent cameras overlap or in the vicinity thereof, when the image 600, the image 610, the image 620, and the image 630 are, respectively, converted into the image 710, the image 720, the image 730, the image 740 looking down from the overhead virtual viewing point V.

Positions of the area 601, the area 602, the area 611, the area 612, the area 621, the area 622, the area 631, and the area 632 can be determined in advance by the calculation. Of the positions of the areas which have been calculated in advance, the positions of the area 601 and the area 602 are stored in the first brightness calculation unit 1601, the positions of the area 611 and the area 612 are stored in the second brightness calculation unit 1602, the positions of the area 621 and the area 622 are stored in the third brightness calculation unit 1603, and the positions of the area 631 and the area 632 are stored in the fourth brightness calculation unit 1604.

Furthermore, out of I a_ave, I b_ave, I c_ave, I d_ave, I e_ave, I f_ave, I g_ave, I h_ave, I a_ave, I b_ave, I c_ave, I d_ave, I e_ave, I which are average values of all pixel values of the areas, a_ave, I b_ave, I c_ave, I e_ave are stored in the first decoder and brightness correction unit 1412, I d_ave and I g_ave are stored in the second decoder and brightness correction unit 1422, and I f_ave, I h_ave are stored in the third decoder and brightness correction unit 1432.

In addition, since no brightness correction is performed on the image 630, w=0 is stored in the fourth data and brightness correction unit 1442.

The image 600, the image 610, the image 620, and the image 630 which have been generated in S7 of FIG. 15 are coordinate transformed by the coordinate transformation unit 1501, and converted into images looking down from the overhead virtual viewing position V (S12 of FIG. 15). The coordinate transformation process is performed by creating the coordinate transformation table 1502 in advance based on camera parameters such as geometric layout of each camera mounted on the vehicle or a focal length of the camera, pixel size, etc. and parameters such as a position of the virtual viewing point V or observation range, etc., and then replacing coordinates of the inputted images on the basis of this coordinate transformation table 1502.

Through the coordinate transformation, the image 600 taken by the front camera 1411 is converted into the image 710, the image 610 taken by the left side camera 1421 is converted into the image 720, the image 620 taken by the right side camera 1431 is converted into the image 730, and the image 630 taken by the rear camera 1441 is converted into the image 740. The converted results are combined into a single image by the image combining unit 1503, and further a virtual image 750 looking down at the own vehicle from the overhead virtual viewing point V is combined therewith and a composite image 700 is generated. Furthermore, the composite image 700 is combined with the image 630 taken by the rear camera 1441 and a single image shown in FIG. 10A is created (S13 of FIG. 15).

The composite image is reconstructed to component signals by the D/A converter 1701 (S14 of FIG. 16), further converted into composite signals by the encoder 1702 (S15 of FIG. 15), and displayed to the monitor 1703 (S16 of FIG. 15).

The start/end instruction detection unit 1800 detects whether or not a shift position is in a retreated position (S17, S18 of FIG. 15). If the shift position is in any position other than the retreated position, the display on the monitor 1703 is cancelled (S20 of FIG. 15).

If it is confirmed that the shift position is in the retreated position, the image is inputted again in S7 of FIG. 15.

The image taken by the left side camera 1421 is converted from composite signals into component signals by the second decoder and brightness correction unit 1422 (S8 of FIG. 15). Then, based on I g_ave and I d_ave stored in the second decoder and brightness correction unit 1422, brightness is corrected (S9 of FIG. 15).

Specifically, brightness correction is performed with the following (Formula 7) by setting a currently set brightness value in the second decoder and brightness correction unit 1422 to B2 and a newly set brightness value to B2' by the brightness correction:

$$B2'=B2+(I\,g\_ave-I\,d\_ave)\times w \quad \text{(Formula 7)}$$

Furthermore, the image taken by the right side camera 1431 is converted from composite signals into component signals by the third decoder and brightness correction unit 1432 (S8 of FIG. 15) and then brightness is corrected based on the I h_ave and I f_ave stored in the third decoder and brightness correction unit 1432 (S9 of FIG. 15).

That is to say, by setting a currently set brightness value in the third decoder and bright correction unit 1432 to B3 and a newly set brightness value by the brightness correction to B3', brightness is corrected with the following (Formula 8):

$$B3'=B3+(1\,h\_ave-1\,f\_ave)\times w \quad \text{(Formula 8)}$$

Then, an image taken by the front camera 1411 is brightness corrected and the correction is performed based on the result of the brightness correction of images inputted from the left side camera 1421 and the right side camera 1421. That is to say, the brightness correction of an image taken by the front camera 1411 is performed when an image is inputted next time, rather than being performed here.

In addition, an image taken by the rear camera 1441 is not brightness controlled. That is to say, if a currently set brightness value in the fourth decoder and brightness correction unit 1442 is B4 and a newly set brightness value by the brightness correction is B4', B4' is calculated with (Formula 4):

The image with the brightness thereof corrected with (Formula 4), (Formula 7), and (Formula 8) is converted into digital signals by the first A/D converter 1412, the second A/D converter 1423, the third A/D converter 1423, and the fourth A/D converter 1442, and an image 600, an image 610, an image 620, and an image 630, which are new, with the brightness thereof corrected is generated (S10 of FIG. 9).

For the brightness corrected images 600, the image 610, the image 620, the image 630 which have thus been obtained, the image brightness calculation unit 1600 calculates I a_ave, I b_ave, I c_ave, I d_ave, I e_ave, I f_have, I g_ave, and I h_ave.

Out of I a_ave, I b_ave, I c_ave, I d_ave, I e_ave, I f_ave, I g_ave, and I h_ave which are calculated, I a_ave, I b_ave, I c_ave, and I e_have are stored in the first decoder and brightness correction unit 1412, I d_ave and I g_ave are stored in the second decoder and brightness correction unit 1422, and I f_ave and I h_ave are stored in the third decoder and brightness correction unit 1432.

In addition, since no brightness correction is performed on an image inputted from the rear camera, w=0 is stored in the fourth decoder and brightness correction unit 1442.

Next, a coordinate transformation process and an image combining process are performed on the brightness corrected images (S12, S13 of FIG. 15). After being subjected to D/A conversion, the composite image is converted into composite signals by the encoding process and outputted to the monitor 1103 (S14, S15, S16 of FIG. 15).

If it is determined in S17, S18 of FIG. 15 that the shift position is in the retreated position, images are simultaneously inputted from the front camera 1411, the left side camera 1421, the right side camera 1431, and the rear camera 1411 in S7 of FIG. 15.

After a series of processes described above are repeated again, the image brightness calculation unit 1600 calculates each value of brightness I a_ave, I b_ave, I c_ave, I d_ave I e_ave, I f_ave, I g_ave, I h_ave in the predetermined areas in each image, and these values are stored in the predetermined decoders and brightness correction units as described earlier, brightness of the image taken by the left side camera 1421 and brightness of the image taken by the right side camera 1431 are respectively corrected based on the brightness of the images taken by the rear camera 1441.

Furthermore, brightness of the images taken by the front camera 1411 is corrected, using values of I a_ave, I b_ave, I c_ave, I e_ave stored in the first decoder and brightness correction unit 1411. Now, by setting a currently set brightness value in the first decoder and brightness correction unit 1412 to B1 and a newly set brightness value by the brightness unit to B1', the brightness correction is performed with (Formula 9):

$$B1'=B1+((I\,c\_ave+I\,e\_ave)/2-(Ia\_ave+I\,b\_ave)/2)\times w \quad \text{(Formula 9)}$$

Subsequently, the coordinate transformation/combining process is performed on the brightness corrected images. Then, they are subjected to the D/A process and encoded, and the result thereof is outputted to the monitor 1703.

If it is confirmed that the shift position is in the retreated position, a next image is inputted. Then, brightness correction with (Formula 4), (Formula 7), (Formula 8), and (Formula 9) are performed. Thereafter, as far as the shift position is in the retreated position, a series of processes described above will be repeated.

Then, the operation when the imaging-unit-selecting unit 1900 selects the front camera 1411 will be described hereinafter.

First, as shown in FIG. 12B, FIG. 12C, FIG. 12D, and FIG. 12E, in the image 600, the image 610, the image 620, the image 630, the first brightness calculation unit 1602 calculates average values, I a_ave, I b_ave, I c_ave, I d_ave, I e_ave, I f_ave, I g_ave, I h_ave of all pixel values, respectively, in the area 601, the area 602, the area 611, the area 612, the area 621, the area 622, the area 631, and the area 632 which have been set in a predetermined size in prescribed positions which have been determined in advance (S11 of FIG. 15).

Now, as shown in FIG. 12A, the area 601, the area 602, the area 611, the area 612, the area 621, the area 622, the area 631, and the area 632 are areas to be converted, respectively, into a rectangular area 711, a rectangular area 712, a rectangular area 721 a rectangular area 722, a rectangular area 731, a rectangular area 732, a rectangular area 741 and a rectangular area 742 which have a size of width A and length B and which are located at a position where imaging ranges of adjacent cameras overlap or in the vicinity thereof, when the image 600, the image 610, the image 620, the image 630 are converted into the image 710, the image 720, the image 730, and the image 740 looking down from the overhead virtual viewing point V.

The area 601, the area 602, the area 611, the area 612, the area 621, the area 622, the area 631, and the area 632 can be determined in advance by calculations. Of the calculated positions of the areas, the positions of the area 601 and the area 602 are stored in the first brightness calculation unit 1601, the positions of the area 611 and the area 612 are stored in the second brightness calculation unit 1602, the positions of the area 621 and the area 622 are stored in the third brightness calculation 1603, and the positions of the area 631 and the area 632 are stored in the fourth brightness calculation unit 1604.

Furthermore, out of I a_ave, I b_ave I c_ave, I d_ave, I e_ave, I f_ave, I g_ave, and I h_ave which are calculated, I d_ave, I f_ave, I g_ave, and I h_ave are stored in the fourth decoder and brightness correction unit 1422, I a_ave and I c_ave are stored in the second decoder and brightness correction unit 1422, and I b_ave and I e_ave are stored in the third decoder and brightness correction unit 1432.

In addition, since no brightness correction is performed on an image taken by the front camera 1411, w=0 is stored in the first decoder and brightness correction unit 1412.

The image 600, the image 610, the image 620, the image 630 which have been generated in S7 of FIG. 15 are coordinate transformed by the coordinate transformation unit 1501 and converted into images looking down from the overhead virtual viewing point V (S12 of FIG. 15). The coordinate transformation process is performed by creating the coordinate transformation table 1502 in advance based on camera parameters such as geometric layout of each camera mounted on the vehicle or a focal length of the camera, pixel size, etc. and parameters such as a position of the virtual viewing point or observation range, etc., and then replacing coordinates of the inputted images on the basis of this coordinate transformation table 1502.

Through the coordinate transformation, the image 600 is converted into the image 710, the image 610 is converted into the image 720, the image 620 is converted into the image 730, and the image 630 is converted into the image 740. The converted results are combined into a single image by the image combining unit 1503, and further a virtual image 750 looking down at the own vehicle from the overhead virtual viewing point V is combined therewith and a composite image 700 is generated. Furthermore, the composite image 700 is combined with the image 600, and a single image shown in FIG. 10B is created (S13 of FIG. 15).

The composite image is reconstructed to component signals by the D/A converter 1701 (S14 of FIG. 15), further converted into composite signals by the encoder 1702 (S15 of FIG. 15), and displayed to the monitor 1703 (S16 of FIG. 15).

The start/end instruction detection unit 1800 judges that the front camera 1411 is in a selected state and a vehicle speed is less than or equal to a predetermined value (S17, S18 of FIG. 15). If the condition is not matched, the display on the monitor 1703 is cancelled (S21 of FIG. 15).

On the other hand, if it is judged that the condition is matched, image is inputted once again in S7 of FIG. 15.

In S7 of FIG. 15, after images are inputted again, an image taken by the left side camera 1421 is converted from composite signals into component signals by the second decoder and brightness correction unit 1422 (S8 of FIG. 15). Then, brightness is corrected based on I a_ave and I c_ave stored in the second decoder and brightness correction unit 1422 (S9 of FIG. 15).

Specifically, brightness correction is performed with the following (Formula 10) by setting a currently set brightness value in the second decoder and brightness correction unit 1422 to B2 and a newly set brightness value to B2' by the brightness correction:

$$B2'=B2+(I\ a\_\text{ave}-I\ c\_\text{ave})\times w \quad \text{(Formula 10)}$$

Furthermore, the image taken by the right side camera 1431 is converted from composite signals into component signals by the third decoder and brightness correction unit 1432 (S8 of FIG. 15) and then brightness is corrected based on the I b_ave and I e_ave stored in the third decoder and brightness correction unit 1432 (S9 of FIG. 15).

That is to say, by setting a currently set brightness value in the third decoder and bright correction unit 1432 to B3 and a newly set brightness value by the brightness correction to B3', brightness is corrected with the following (Formula 11):

$$B3'=B3+(1\ h\_\text{ave}-1\ e\_\text{ave})\times w \quad \text{(Formula 11)}$$

Then, an image taken by the rear camera 1441 is brightness corrected and the correction is performed based on the result of the brightness correction of images inputted from the left side camera 1421 and the right side camera 1431. That is to say, the brightness correction of an image taken by the rear camera 1441 is performed when an image is inputted next time, rather than being performed here.

In addition, since an image taken by the front camera 1411 is not brightness controlled, if a currently set brightness value in the first decoder and brightness correction unit 1412 is B1 and a newly set brightness value by the brightness correction is B1', B1' is calculated with (Formula 6):

The image with the brightness thereof corrected with (Formula 6), (Formula 10), and (Formula 11) is converted into digital signals by the first A/D converter 1413, the second A/D converter 1423, the third A/D converter 1433, and the fourth A/D converter 1443, and an image 600, an image 610, an image 620, and an image 630, which are new, with the brightness thereof corrected is generated (S10 of FIG. 9).

Thus, for the brightness corrected images 600, the image 610, the image 620, the image 630, the image brightness calculation unit 1600 calculates I a_ave, I b_ave, I c_ave, I d_ave, I e_ave, I f_have, I g_ave, and I h_ave.

Out of I a_ave, I b_ave, I c_ave, I d_ave, I e_ave, I f_ave, I g_ave, and I h_ave which are calculated, I a_ave, I b_ave, I c_ave, and I e_have are stored in the fourth decoder and brightness correction unit 1442, I d_ave and I g_ave are stored in the second decoder and brightness correction unit 1422, and I f_ave and I h_ave are stored in the third decoder and brightness correction unit 1432.

In addition, since no brightness correction is performed on the image 600, w=0 is stored in the first decoder and brightness correction unit 1412.

Next, a coordinate transformation process and an image combining process are performed on the brightness corrected images (S12, S13 of FIG. 15). After being subjected to D/A conversion, the composite images are converted into composite signals by the encoding process and outputted to the monitor 1103 (S14, S15, S16 of FIG. 15).

If it is determined in S17, S18 of FIG. 15 that the front camera 1411 has been selected and a vehicle speed is less than or equal to a predetermined value, images are simultaneously inputted from the front camera 1411, the left side camera 1421, the right side camera 1431, and the rear camera 1441 in S7 of FIG. 15.

After a series of processes described above are repeated again, the image brightness calculation unit 1600 calculates each value of brightness I a_ave, I b_ave, I c_ave, I d_ave I e_ave, I f_ave, I g_ave, I h_ave in the predetermined areas in each image. The values are stored in the predetermined decoders and brightness correction units, brightness of the image taken by the left side camera 1421 and brightness of the image taken by the right side camera 1431 are respectively corrected based on the brightness of the images taken by the front camera 1411.

Furthermore, brightness of the images taken by the rear camera 1441 is corrected, using values of I d_ave, I f_ave, I g_ave, I h_ave stored in the fourth decoder and brightness correction unit 1442. Now, by setting a currently set brightness value in the first decoder and brightness correction unit 1442 to B4 and a newly set brightness value by the brightness unit to B4', the brightness correction is performed with (Formula 12):

$$B4'=B4+((I\ d\_\text{ave}+I\ f\_\text{ave})/2-(I\ g\_\text{ave}+I\ h\_\text{ave})/2)\times w \quad \text{(Formula 12)}$$

Subsequently, the coordinate transformation/combining process is performed on the brightness corrected images. Then, they are subjected to the D/A process and encoded, and the result thereof is outputted to the monitor 1703.

If it is confirmed that the front camera 1411 has been selected and the vehicle speed is less than and equal to the predetermined value, a next image is inputted. Then, brightness correction with (Formula 6), (Formula 10), (Formula 11), and (Formula 12) are performed. Thereafter, as far as the vehicle speed is less than or equal to the predetermined value, a series of processes described above will be repeated. Every time they are performed, brightness of the images is corrected based on the calculated newest brightness value.

With the vehicle periphery monitoring device according to such configured embodiment, since it is possible to perform brightness connection so that two images are equal in brightness in an overlapping imaging range in which two images overlap in part or in brightness in the vicinity thereof, as well as to recursively correct brightness of a different image captured for a range overlapping with the image on the basis of brightness of a reference image, in the vehicle periphery monitoring device which combines a number of images into one image and displays it, a feeling of unevenness at the seams of images can be considerably reduced, and easy-to-see images can be provided to drivers.

Furthermore, since image brightness correction can be performed by adjustment of brightness when images taken by imaging units are decoded, the brightness correction can be performed in a short period of time.

In addition, the operation of the vehicle periphery monitoring device of the embodiment described above corresponds to an embodiment of a vehicle periphery image display method according to the present invention.

In addition, here, although the embodiment 3 includes the imaging-unit-selecting unit 1900 for selecting one imaging unit from the plurality of imaging units 1410, the configuration of this part is not limited to this, and one specific imaging unit which has been determined in advance may be selected.

CROSS-REFERENCE TO RELATED APPLICATIONS

The present application claims priority on the basis of Japanese Patent Application No. 2009-176308 filed to Japan Patent Office on Jul. 29, 2009, which is incorporated in entirety herein by reference.

The invention claimed is:
1. A vehicle periphery monitoring device comprising:
 a plurality of imaging units mounted on a vehicle and configured to capture images of a vehicle periphery;

an image brightness calculation processor configured to calculate a value corresponding to brightness of images taken by the plurality of imaging units;

a brightness correction unit, said brightness correction unit being configured to correct the brightness of the images obtained by the plurality of imaging units on the basis of the value calculated by the image brightness calculation processor;

an image combining processor configured to combine the plurality of images obtained by the plurality of imaging units and corrected by the brightness correction unit into a single image;

an image convertor that converts the single image formed by the image combining processor into an overhead image viewed from right above the vehicle;

a traveling direction judgment processor configured to judge a traveling direction of a vehicle;

an imaging-unit-selecting processor configured to select one image from the images taken by the plurality of imaging units on the basis of a judgment result of the traveling direction judgment processor; and an image display unit that simultaneously displays the overhead image formed by the image convertor and one image selected by the imaging-unit-selecting processor;

wherein the image brightness calculation processor calculates a value corresponding to brightness of the image imaged by the imaging unit corresponding to a traveling direction of the vehicle based on the determination result of the traveling direction judgment processor and selected by the imaging-unit-selecting processor, the brightness correction unit corrects brightness of the images taken by the plurality of imaging units other than the imaging unit corresponding to the traveling direction based on the difference between the value corresponding to the brightness of the image taken by the imaging unit in the traveling direction and calculated by the image brightness calculation processor and the values corresponding to brightness of the others of the plurality of the imaging units for an image area which is overlapped on the image area of the traveling direction, and the image display unit simultaneously displays the overhead image combined by the image combining processor and converted by the image convertor and the image selected by the imaging-unit-selecting processor, the brightness of the combined and converted overhead image being corrected.

2. The vehicle periphery monitoring device according to claim 1, wherein the imaging-unit-selecting processor selects a first imaging unit from the plurality of imaging units which capture images in three or more directions and which are mounted so that ranges captured by at least two of the plurality of imaging units partly overlap each other, the image brightness calculation processor calculates a value corresponding to brightness of a first overlapping imaging range included in an image taken by the selected first imaging unit and in an image taken by a second imaging unit which shares the first overlapping imaging range with the selected first imaging unit, or calculates a value corresponding to brightness of a neighborhood of the first overlapping imaging range, the brightness correction unit corrects brightness of the image taken by the second imaging unit on the basis of the calculated value, based on the brightness corrected result, the image brightness calculation processor further calculates a new value corresponding to brightness of a second overlapping imaging range or corresponding to brightness of a neighborhood of the second overlapping imaging range, from the brightness corrected image and an image taken by a third imaging unit and sharing the second overlapping imaging range with the brightness corrected image, the brightness correction unit further corrects brightness of the image taken by the third imaging unit on the basis of the calculated new value, and the image brightness calculation processor and the brightness correction unit sequentially repeat the calculation of brightness and the correction of brightness in the same manner thereafter.

3. The vehicle periphery monitoring device according to claim 1, wherein the image brightness calculation processor calculates a value corresponding to brightness of a first overlapping imaging range included in an image taken by a first imaging unit of the plurality of imaging units, which capture images in three or more directions and which are mounted so that ranges captured by at least two of the plurality of imaging units partly overlap each other, and included in an image taken by a second imaging unit sharing the first overlapping imaging range with the first imaging unit or calculates a value corresponding to brightness of a neighborhood of the first overlapping imaging range, the brightness correction unit corrects brightness of the image taken by the second imaging unit on the basis of the calculated value, based on the brightness corrected result, the image brightness calculation processor further calculates a new value corresponding to brightness of a second overlapping imaging range or corresponding to brightness of a neighborhood of the second overlapping imaging unit, from the brightness corrected image and an image taken by a third imaging unit and sharing the second overlapping imaging range with the brightness corrected image, the brightness correction unit further corrects brightness of the image taken by the third imaging unit on the basis of the calculated new value, and the image brightness calculation processor and the brightness correction unit sequentially repeat the calculation of brightness and the correction of the brightness in the same manner thereafter.

4. A vehicle periphery image display method for displaying, in one display screen, an image obtained by combining a plurality of images of a vehicle periphery taken by a plurality of imaging units and an image taken by one of the plurality of imaging units, comprising the steps of:

judging a traveling direction of a vehicle;

selecting one image from a plurality of images captured for a vehicle periphery on the basis of the judgment result of the traveling direction;

calculating a value corresponding to brightness for each of the plurality of images;

correcting brightness of the plurality of images, except the one image selected based on the traveling direction, on the basis of difference between the calculated value of the one image and each value of the plurality of images which has an overlapping portion with the one image;

performing a predetermined coordinate transformation process on the plurality of images, the brightness of which is corrected;

combining the plurality of coordinate-transformed images into a single image;

converting the single image into an overhead image viewed from right above the vehicle;

displaying the overhead image and the one image simultaneously.

5. The vehicle periphery image display method according to claim 4, further comprising the steps of:

selecting a first image from a plurality of images captured for three or more directions and set so that imaging ranges of at least two of the plurality of images partly overlap each other;

calculating a value corresponding to brightness of a first overlapping imaging range included in the selected first image and in a second image sharing the first overlapping imaging area with the selected first image, or a value corresponding to brightness of a neighborhood of the first overlapping imaging range;

correcting brightness of the second image on the basis of the calculated value;

calculating, based on the brightness corrected result, a new value corresponding to brightness of a second overlapping imaging range or corresponding to brightness of a neighborhood of the second overlapping imaging area from the brightness corrected image and a third image sharing the second overlapping imaging range with the brightness corrected image;

correcting brightness of the third image on the basis of the calculated new value; and sequentially repeating the calculation of brightness and the correction of brightness in the same manner thereafter.

6. The vehicle periphery image display method according to claim 4, further comprising the steps of:

calculating a value corresponding to brightness of a first overlapping imaging range included in a first image of a plurality of images captured for three or more directions and set so that imaging ranges of at least two of the plurality of images partly overlap, and included in a second image in which the first overlapping imaging area that overlaps the first image is captured, or a value corresponding to brightness of a neighborhood of the first overlapping imaging range;

correcting brightness of the different image on the basis of the calculated value;

calculating, based on the brightness corrected result, a new value corresponding to brightness of a second overlapping imaging area or corresponding to brightness of a neighborhood of the second overlapping imaging range, from the brightness corrected image and a third image sharing the second overlapping imaging range with the brightness corrected image;

correcting brightness of the third image on the basis of the calculated new value; and sequentially repeating the calculation of brightness and the correction of brightness in the same manner thereafter.

* * * * *